US012367829B2

(12) United States Patent
Kim et al.

(10) Patent No.: US 12,367,829 B2
(45) Date of Patent: Jul. 22, 2025

(54) PIXEL CAPABLE OF COMPENSATING FOR THRESHOLD VOLTAGE OF DRIVING TRANSISTOR AND DISPLAY DEVICE INCLUDING THE SAME

(71) Applicant: Samsung Display Co., LTD., Yongin-si (KR)

(72) Inventors: Dong Woo Kim, Yongin-si (KR); Kwi Hyun Kim, Yongin-si (KR); Yeon Kyung Kim, Yongin-si (KR); Do Yeong Park, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/421,098

(22) Filed: Jan. 24, 2024

(65) Prior Publication Data

US 2024/0339076 A1 Oct. 10, 2024

(30) Foreign Application Priority Data

Apr. 10, 2023 (KR) ........................ 10-2023-0047129

(51) Int. Cl.
*G09G 3/3233* (2016.01)

(52) U.S. Cl.
CPC ... *G09G 3/3233* (2013.01); *G09G 2300/0819* (2013.01); *G09G 2300/0852* (2013.01); *G09G 2300/0861* (2013.01); *G09G 2310/08* (2013.01)

(58) Field of Classification Search
CPC ......... G09G 3/3233; G09G 2300/0819; G09G 2300/0852; G09G 2300/0861; G09G 2310/08
See application file for complete search history.

(56) References Cited

U.S. PATENT DOCUMENTS

| | | | | |
|---|---|---|---|---|
| 6,580,657 | B2 | 6/2003 | Sanford et al. | |
| 11,158,250 | B2 | 10/2021 | Xiao et al. | |
| 11,361,711 | B2 * | 6/2022 | Dong | G09G 3/3233 |
| 2009/0108763 | A1 | 4/2009 | Han et al. | |
| 2017/0148387 | A1 | 5/2017 | Lin | |
| 2020/0342813 | A1 | 10/2020 | Gao et al. | |

FOREIGN PATENT DOCUMENTS

| | | |
|---|---|---|
| CN | 108492770 | 9/2018 |
| CN | 111489696 | 8/2020 |
| CN | 112509518 | 3/2021 |
| KR | 10-2022-0107797 | 8/2022 |

* cited by examiner

*Primary Examiner* — Afroza Chowdhury

(74) *Attorney, Agent, or Firm* — KILE PARK REED & HOUTTEMAN PLLC

(57) ABSTRACT

A pixel includes a first transistor including a first electrode electrically connected to a first power line, a second electrode, and a gate electrode connected to a first node, a light emitting element including a first electrode, and a second electrode electrically connected to a second power line, a second transistor connected between a data line and a second node, and including a gate electrode electrically connected to a first scan line, a third transistor connected between the second node and the first electrode of the light emitting element, and including a gate electrode electrically connected to a second scan line, a first capacitor connected between the first power line and the first node, and a second capacitor connected between the first node and the second node.

22 Claims, 18 Drawing Sheets

PIXEL CAPABLE OF COMPENSATING FOR THRESHOLD VOLTAGE OF DRIVING TRANSISTOR AND DISPLAY DEVICE INCLUDING THE SAME

CROSS REFERENCE TO RELATED APPLICATION(S)

This application claims priority to and benefits of Korean Patent Application No. 10-2023-0047129 under 35 U.S.C. § 119, filed on Apr. 10, 2023, the entire content of which are incorporated herein by reference.

BACKGROUND

1. Technical Field

Embodiments relate to a pixel and a display device including the pixel.

2. Description of the Related Art

As information technology is developed, the importance of a display device, which is a connection medium between a user and information, has been highlighted. In response to this, the utilization of a display device such as a liquid crystal display device and an organic light emitting display device has been increased.

The display device displays an image by using pixels. A pixel includes a driving transistor, and includes transistors and capacitors to compensate for a threshold voltage of the driving transistor. In case that a large number of transistors and capacitors are included in the pixel, implementing the pixel in a high-resolution display device is difficult. Therefore, a pixel applicable to a high-resolution display device is required.

SUMMARY

Embodiments provide a pixel capable of compensating for a threshold voltage of a driving transistor and applicable to high-resolution, and a display device including the pixel.

Embodiments provide a pixel capable of sufficiently widely setting a voltage range of a data signal, and a display device including the pixel.

However, embodiments of the disclosure are not limited to those set forth herein. The above and other embodiments will become more apparent to one of ordinary skill in the art to which the disclosure pertains by referencing the detailed description of the disclosure given below.

According to embodiments, a pixel may include a first transistor including a first electrode electrically connected to a first power line, a second electrode, and a gate electrode connected to a first node, a light emitting element including a first electrode, and a second electrode electrically connected to a second power line, a second transistor connected between a data line and a second node, and including a gate electrode electrically connected to a first scan line, a third transistor connected between the second node and the first electrode of the light emitting element, and including a gate electrode electrically connected to a second scan line, a first capacitor connected between the first power line and the first node, and a second capacitor connected between the first node and the second node.

According to an embodiment, the pixel may further include a fourth transistor connected between the first node and the second electrode of the first transistor, and including a gate electrode electrically connected to a third scan line, and a fifth transistor connected between the second electrode of the first transistor and the first electrode of the light emitting element, and including a gate electrode electrically connected to a first emission control line.

According to an embodiment, the second transistor, the third transistor, the fourth transistor, and the fifth transistor may be turned on during an initialization period.

According to an embodiment, the second transistor, the third transistor, and the fourth transistor may maintain a turn-on state, and the fifth transistor may be turned off during a compensation period after the initialization period.

According to an embodiment, during a data writing period after the compensation period, the data signal may be supplied to the data line, the second transistor may maintain a turn-on state, and the third and fourth transistors may be turned off.

According to an embodiment, a reference power voltage may be supplied to the data line during the initialization period and the compensation period, and the reference power voltage may be set to a voltage that turns off the light emitting element.

According to an embodiment, during the initialization period and the compensation period, a reference power voltage may be supplied to the data line, and the reference power voltage may be set to a voltage between a first driving power voltage supplied to the first power line and a second driving power voltage supplied to the second power line.

According to an embodiment, the second scan line and the third scan line may be formed as a same scan line.

According to an embodiment, the pixel may further include a sixth transistor connected between the first power line and the first electrode of the first transistor, and including a gate electrode electrically connected to a second emission control line.

According to an embodiment, the sixth transistor may be set to a turn-off state during a horizontal period in which the data signal is supplied.

According to an embodiment, a display device may include pixels connected to first scan lines, second scan lines, third scan lines, data lines, and first emission control lines, and a pixel positioned in an i-th pixel row and a j-th pixel column, where i and j may be integers greater than or equal to 1, may include a first transistor including a first electrode electrically connected to a first power line, a second electrode, and a gate electrode connected to a first node, a light emitting element including a first electrode, and a second electrode connected to a second power line, a second transistor connected between a j-th data line and a second node and turned on in case that a first scan signal is supplied to an i-th first scan line, a third transistor connected between the second node and the first electrode of the light emitting element and turned on in case that a second scan signal is supplied to an i-th second scan line, a first capacitor connected between the first power line and the first node, and a second capacitor connected between the first node and the second node.

According to an embodiment, the pixel positioned in the i-th pixel row and the j-th pixel column may further include a fourth transistor connected between the first node and the second electrode of the first transistor and turned on in case that a third scan signal is supplied to an i-th third scan line, and a fifth transistor connected between the second electrode of the first transistor and the first electrode of the light emitting element, and is turned off in case that a first emission control signal is supplied to a k-th emission control line, where k may be an integer greater than or equal to 1.

According to an embodiment, the display device may further include a data driver that supplies a data signal to the data lines, a scan driver that supplies the first scan signal to the first scan lines, the second scan signal to the second scan lines, and the third scan signal to the third scan lines, and a first emission driver that supplies the first emission control signal to the first emission control lines.

According to an embodiment, a horizontal period may include an initialization period, a compensation period, and a data writing period, and the scan driver may supply the first scan signal to the i-th first scan line during the initialization period, the compensation period, and the data writing period, and may supply the second scan signal to the i-th second scan line and the third scan signal to the i-th third scan line during the initialization period and the compensation period.

According to an embodiment, the second scan line and the third scan line may be formed as a same scan line, and the third scan signal and the second scan signal may be a same signal as.

According to an embodiment, the scan driver may include a first scan driver that supplies the first scan signal, and a second scan driver that supplies the second scan signal.

According to an embodiment, the scan driver may include a first scan driver that supplies the first scan signal, a second scan driver that supplies the second scan signal, and a third scan driver that supplies the third scan signal.

According to an embodiment, the data driver may supply a reference power voltage to the j-th data line during the initialization period and the compensation period, and may supply the data signal during the data writing period.

According to an embodiment, the reference power voltage may be set so that the light emitting element may be turned off.

According to an embodiment, the reference power voltage may be set to a voltage between a first driving power voltage supplied to the first power line and a second driving power voltage supplied to the second power line.

According to an embodiment, the pixels may be further connected to second emission control lines, and the pixel positioned in the i-th pixel row and the j-th pixel column further may include a sixth transistor connected between the first power line and the first electrode of the first transistor and turned off in case that a second emission control signal is supplied to a k-th second emission control line.

According to an embodiment, the display device may further include a second emission driver that supplies a second emission control signal to the second emission control lines, and the second emission driver may supply the second emission control signal to the k-th second emission control line during the initialization period, the compensation period, and the data writing period.

Objects of the disclosure are not limited to the objects described above, and other technical objects which are not described will be clearly understood by those skilled in the art from the following description.

The pixel according to embodiments may compensate for a threshold voltage of a driving transistor using five transistors and two capacitors, and thus may be applied to a high-resolution display device.

The pixel according to embodiments may transfer a data signal using coupling of a capacitor, and thus may widely set a voltage range of the data signal.

However, an effect of the disclosure is not limited to the above-described effect, and may be variously expanded without departing from the spirit and scope of the disclosure.

BRIEF DESCRIPTION OF THE DRAWINGS

The above and other features of the disclosure will become more apparent by describing in further detail embodiments thereof with reference to the accompanying drawings, in which.

DETAILED DESCRIPTION OF THE EMBODIMENTS

Figure 1:
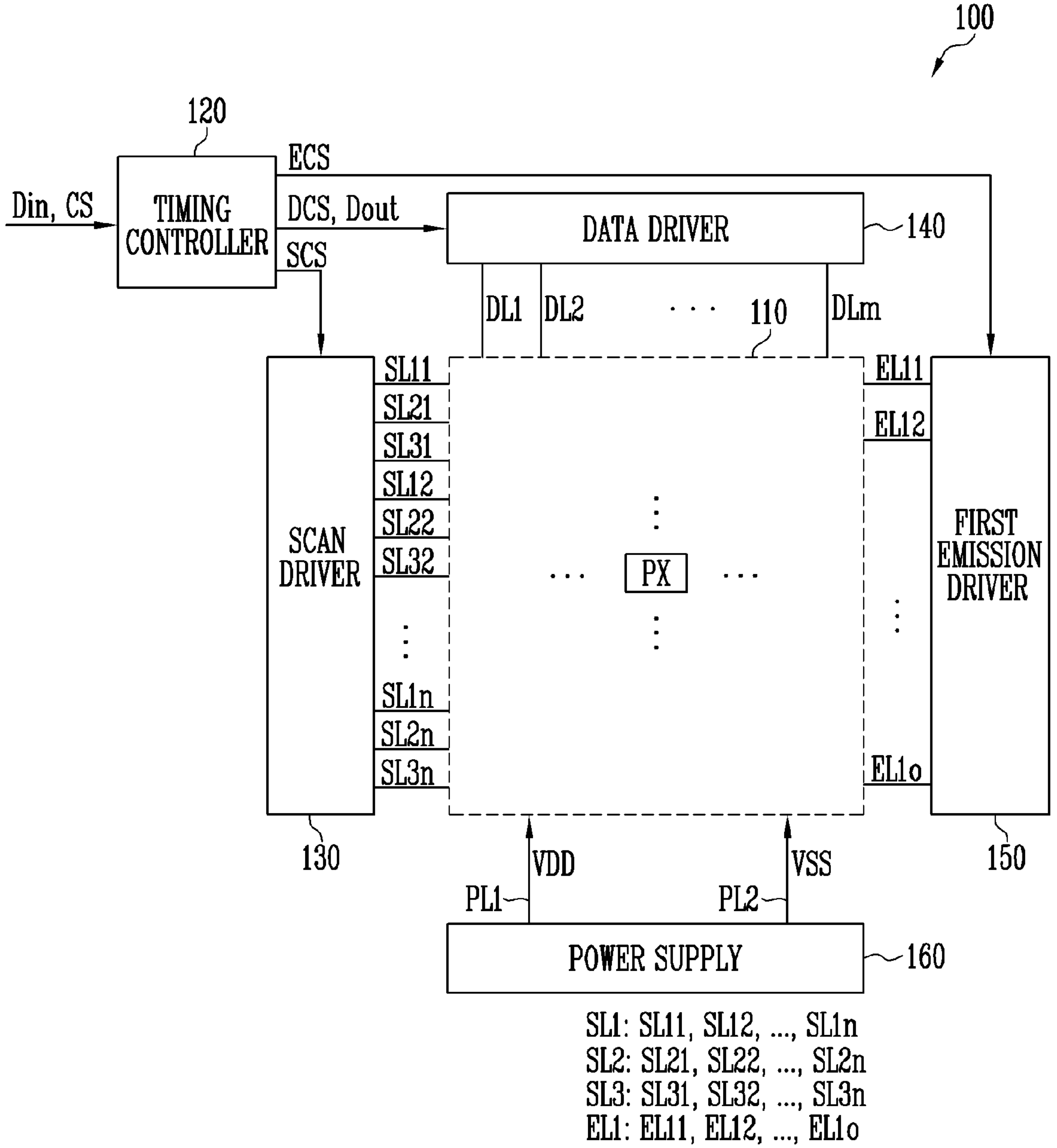
FIG. 1 is a schematic diagram illustrating a display device according to an embodiment.

In the following description, for the purposes of explanation, numerous specific details are set forth in order to provide a thorough understanding of various embodiments or implementations of the invention. As used herein "embodiments" and "implementations" are interchangeable words that are non-limiting examples of devices or methods disclosed herein. It is apparent, however, that various embodiments may be practiced without these specific details or with one or more equivalent arrangements. Here, various embodiments do not have to be exclusive nor limit the disclosure. For example, specific shapes, configurations, and characteristics of an embodiment may be used or implemented in another embodiment.

Unless otherwise specified, the illustrated embodiments are to be understood as providing features of the invention. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the invention.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the X-axis, the Y-axis, and the Z-axis are not limited to three axes of a rectangular coordinate system, such as the x, y, and z axes, and may be interpreted in a broader sense. For example, the X-axis, the Y-axis, and the Z-axis may be perpendicular to one another, or may represent different directions that are not perpendicular to one another. For the purposes of this disclosure, "at least one of A and B" may be construed as understood to mean A only, B only, or any combination of A and B. Also, "at least one of X, Y, and Z" and "at least one selected from the group consisting of X, Y, and Z" may be construed as X only, Y only, Z only, or any combination of two or more of X, Y, and Z. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various embodiments are described herein with reference to sectional and/or exploded illustrations that are schematic illustrations of embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As customary in the field, some embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some embodiments may be physically separated into two or more interacting and discrete blocks, units, and/or modules without departing from the scope of the invention. Further, the blocks, units, and/or modules of some embodiments may be physically combined into more complex blocks, units, and/or modules without departing from the scope of the invention.

Figure 2:
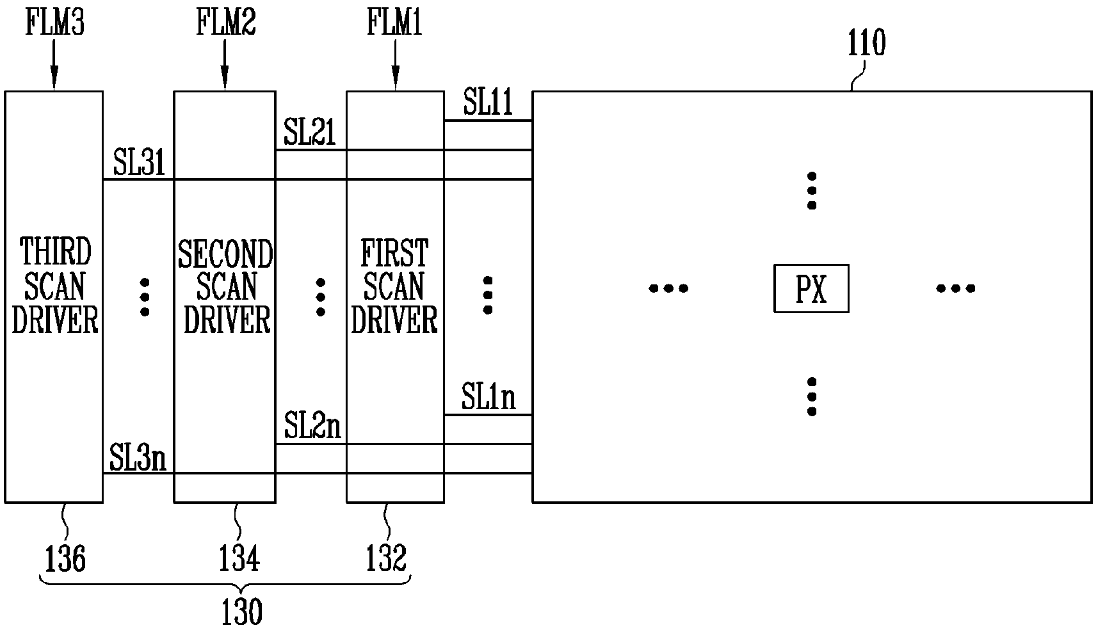
FIG. 2 is a schematic diagram illustrating an embodiment of a scan driver shown in FIG. 1.

FIG. 1 is a schematic diagram illustrating a display device according to an embodiment. FIG. 2 is a schematic diagram illustrating an embodiment of a scan driver shown in FIG. 1.

Referring to FIG. 1, the display device 100 according to an embodiment may include a pixel unit 110, a timing controller 120, a scan driver 130, a data driver 140, a first emission driver 150, and a power supply 160. The above-described configurations may be implemented as separate integrated circuits, and two or more configurations among the above-described configurations may be integrated into a single integrated circuit and implemented.

The pixel unit 110 may include pixels PX connected to first scan lines SL11, SL12, . . . , and SL1*n*, second scan lines SL21, SL22, . . . , and SL2*n*, third scan lines SL31, SL32, . . . , SL3*n*, data lines DL1, DL2, . . . , and DLm, first emission control lines EL11, EL12, . . . , and EL1*o*, and power lines PL1 and PL2, where n, m, and o may be integers greater than or equal to 1.

For example, a pixel PXij (refer to FIG. 3) positioned on an i-th horizontal line (or pixel row) and a j-th vertical line (or pixel column) may be connected to an i-th first scan line SL1*i*, an i-th second scan line SL2*i*, an i-th third scan line SL3*i*, a k-th first emission control line EL1*k*, and a j-th data line DLj, where i may be an integer less than or equal to n, j may be an integer less than or equal to n, and k may be an integer less than or equal to o. Here, k may be a number equal to i or less than i. For example, in case that the first emission control lines EL11 to EL1*o* are positioned on each horizontal line, k and i may be the same number. For example, in case that each of the first emission control lines EL11 to EL1*o* is connected to pixels PX positioned on two or more horizontal lines, k may be a number less than i.

In case that a first scan signal is supplied to the first scan lines SL11 to SL1*n*, the pixels PX may be selected in a horizontal line unit (for example, the pixels PX connected to the same scan line may be classified as one horizontal line (or pixel row)), and the pixels PX selected by the first scan signal may be supplied with a data signal from a data line (any one of DL1 to DLm) connected thereto. The pixels PX receiving the data signal may generate light of a predetermined luminance in response to a voltage of the data signal.

The scan driver 130 may receive a scan driving signal SCS from the timing controller 120. The scan driving signal SCS may include at least one scan start signal and clock signals for driving the scan driver 130. The scan driver 130 may generate the first scan signal, a second scan signal, and a third scan signal by shifting the scan start signal in response to the clock signal.

For example, the scan driver 130 may include a first scan driver 132, a second scan driver 134, and a third scan driver 136 as shown in FIG. 2.

The first scan driver 132 may receive a first scan start signal FLM1 and generate the first scan signal by shifting the first scan start signal FLM1 in response to the clock signal. The first scan driver 132 may sequentially supply the first scan signal to the first scan lines SL11 to SL1*n*.

The second scan driver 134 may receive a second scan start signal FLM2 and generate the second scan signal by shifting the second scan start signal FLM2 in response to the clock signal. The second scan driver 134 may sequentially supply the second scan signal to the second scan lines SL21 to SL2*n*.

The third scan driver 136 may receive a third scan start signal FLM3 and generate the third scan signal by shifting the third scan start signal FLM3 in response to the clock signal. The third scan driver 136 may sequentially supply the third scan signal to the third scan lines SL31 to SL3*n*. The first scan signal, the second scan signal, and the third scan signal may be set to a gate-on voltage so that a transistor included in the pixels PX may be turned on.

For example, a first scan signal, a second scan signal, and a third scan signal of a low level may be supplied to a P-type transistor, and a first scan signal, a second scan signal, and a third scan signal of a high level may be supplied to an N-type transistor. A transistor receiving the first scan signal, the second scan signal, or the third scan signal may be turned on in response to the first scan signal, the second scan signal, or the third scan signal. Thereafter, in case that the first scan signal, the second scan signal, or the third scan signal is supplied, a gate-on voltage may be supplied to a first scan line SL1, a second scan line SL2, or a third scan line SL3. For example, in case that the first scan signal, the second scan signal, or the third scan signal is not supplied, a gate-off voltage may be supplied to the first scan line SL1, the second scan line SL2, or the third scan line SL3.

The data driver 140 may receive output data Dout and a data driving signal DCS from the timing controller 120. The data driving signal DCS may include a sampling signal and/or timing signals for driving the data driver 140. The data driver 140 may generate a data signal based on the data driving signal DCS and the output data Dout. For example, the data driver 140 may generate an analog data signal based on a grayscale of the output data Dout. The data driver 140 may sequentially supply a reference power voltage Vref and a voltage Vdata of the data signal to the data lines DL1 to DLm during one horizontal period 1H (refer to FIG. 4). The reference power voltage Vref may be set to a constant voltage.

The first emission driver 150 may receive an emission driving signal ECS from the timing controller 120. The emission driving signal ECS may include an emission start signal and clock signals for driving the first emission driver 150. The first emission driver 150 may generate a first emission control signal by shifting the emission start signal in response to the clock signal.

For example, the first emission driver 150 may sequentially supply the first emission control signal to the first emission control lines EL11 to EL1*o*. The first emission control signal may be set to a gate-off voltage so that the transistor included in the pixels PX may be turned off. For example, a first emission control signal of a high level may be supplied to a P-type transistor, and a first emission control signal of a low level may be supplied to an N-type transistor. A transistor receiving the first emission control signal may be set to a turn-off state during a period in which the first emission control signal is supplied. Thereafter, in case that the first emission control signal is supplied, a gate-off voltage may be supplied to a first emission control line EL1.

The timing controller 120 may receive input data Din and a control signal CS from a host system through an interface. For example, the timing controller 120 may receive the input data Din and the control signal CS from at least one of a graphics processing unit (GPU), a central processing unit (CPU), and an application processor (AP) included in the host system. The control signal CS may include various signals including the clock signal.

The timing controller 120 may generate the scan driving signal SCS, the data driving signal DCS, and the emission driving signal ECS based on the control signal CS. The scan driving signal SCS, the data driving signal DCS, and the emission driving signals ECS may be supplied to the scan driver 130, the data driver 140, and the first emission driver 150, respectively.

The timing controller 120 may rearrange the input data Din according to a specification of the display device 100. For example, the timing controller 120 may correct the input data Din to generate the output data Dout, and supply the output data Dout to the data driver 140. In an embodiment, the timing controller 120 may correct the input data Din in response to an optical measurement result measured in a process.

The power supply 160 may generate various power for driving the display device 100. For example, the power supply 160 may generate first driving power voltage VDD and second driving power voltage VSS.

The first driving power voltage VDD may supply a driving current to the pixels PX. The second driving power voltage VSS may receive a driving current from the pixels PX. During a period in which the pixels PX are set to an emission state, the first driving power voltage VDD may be set to a voltage higher than that of the second driving power voltage VSS.

The first driving power voltage VDD generated by the power supply 160 may be supplied to a first power line PL1. The second driving power voltage VSS may be supplied to a second power line PL2. The first power line PL1 and the second power line PL2 may be commonly connected to the pixels PX, but embodiments are not limited thereto.

In an embodiment, the first power line PL1 may include a plurality of power lines, and the plurality of power lines may be connected to different pixels PX. In an embodiment, the second power line PL2 may include a plurality of power lines, and the plurality of power lines may be connected to different pixels PX. For example, in an embodiment, the pixels PX may be connected to any one of at least one first power line PL1, and any one of at least one second power line PL2.

Figure 3:
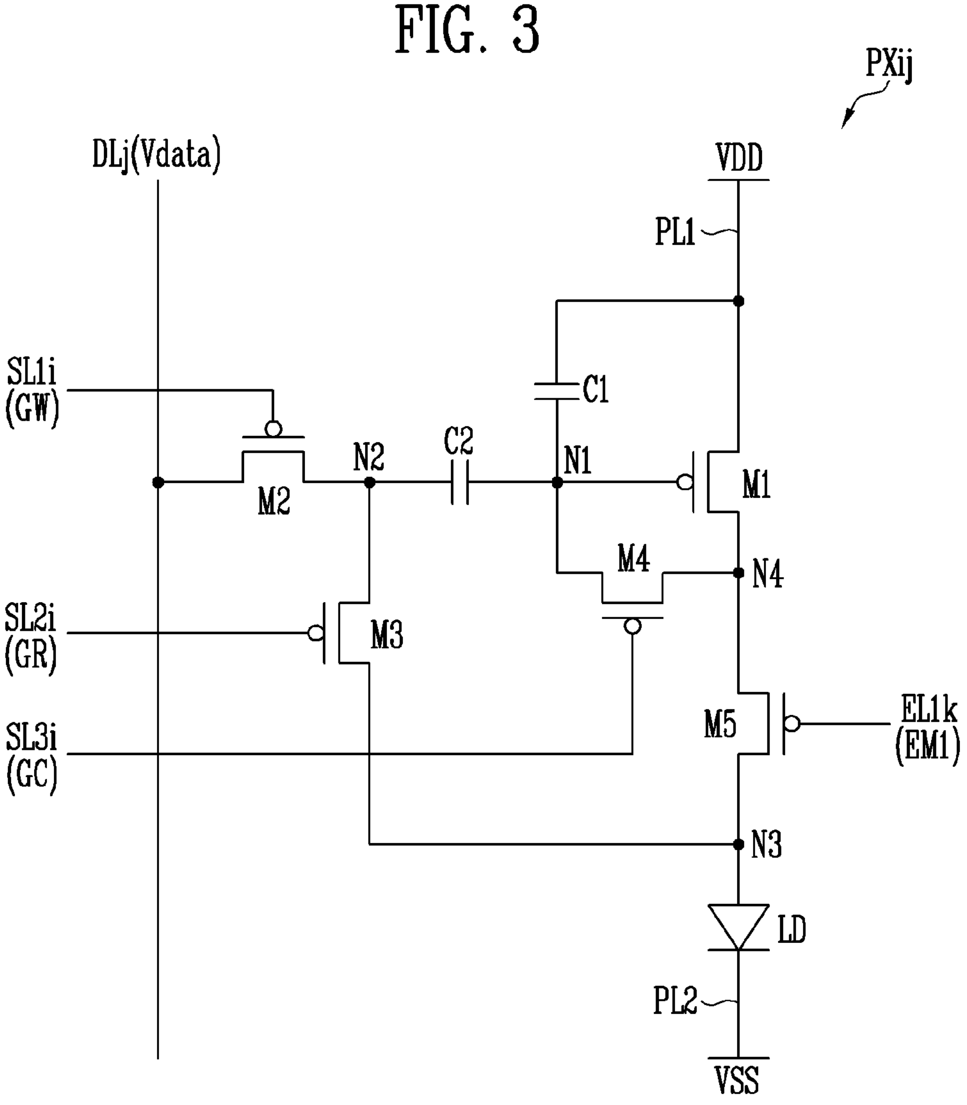
FIG. 3 is a schematic diagram illustrating an embodiment of a pixel shown in FIG. 1.

FIG. 3 is a schematic diagram illustrating an embodiment of the pixel shown in FIG. 1. In FIG. 3, the pixel positioned on the i-th horizontal line and the j-th vertical line is shown.

Referring to FIG. 3, the pixel PXij according to an embodiment may be connected to corresponding signal lines SL1*i*, SL2*i*, SL3*i*, EL1*k*, and DLj. For example, the pixel PXij may be connected to an i-th first scan line SL1*i*, an i-th second scan line SL2*i*, an i-th third scan line SL3*i*, a k-th first emission control line EL1*k*, and a j-th data line DLj. In an embodiment, the pixel PXij may be further connected to the first power line PL1 and the second power line PL2.

The pixel PXij according to an embodiment may include a light emitting element LD and a pixel circuit for controlling an amount of a current supplied to the light emitting element LD.

The light emitting element LD may be connected between the first power line PL1 and the second power line PL2. For example, a first electrode (or an anode electrode) of the light emitting element LD may be connected to the first power line PL1 via a third node N3, a fifth transistor M5, a fourth node N4, and a first transistor M1, and a second electrode (or a cathode electrode) of the light emitting element LD may be connected to the second power line PL2. Thereafter, the expression that a specific electrode is connected to a power line or the like may mean being electrically connected.

The light emitting element LD may generate light of a predetermined luminance in response to an amount of a driving current supplied from the first power line PL1 to the second power line PL2 via the pixel circuit.

The light emitting element LD may be selected as an organic light emitting diode. For example, the light emitting element LD may be selected as an inorganic light emitting diode such as a micro light emitting diode (LED) or a quantum dot light emitting diode. For example, the light emitting element LD may be an element in which an organic material and an inorganic material are combined. Although the pixel PXij is shown as including a single light emitting element LD in FIG. 3, in another example, the pixel PXij may include a plurality of light emitting elements LD, and the plurality of light emitting elements LD may be connected in series, parallel, or series-parallel to each other.

The pixel circuit may include the first transistor M1, a second transistor M2, a third transistor M3, the fourth transistor M4, the fifth transistor M5, a first capacitor C1, and a second capacitor C2. Each of the first to fifth transistors M1 to M5 may be formed in various forms/types such as a thin film transistor (TFT), a field effect transistor (FET), a metal-oxide-semiconductor field effect transistor (MOSFET), and a bipolar junction transistor (BJT).

In an embodiment, the first to fifth transistors M1 to M5 may be formed as P-type transistors. However, this is an example, and at least one of the first to fifth transistors M1 to M5 may be replaced with an N-type transistor.

A first electrode of the first transistor M1 (or driving transistor) may be connected to the first power line PL1, and a second electrode may be connected to the fourth node N4. For example, a gate electrode of the first transistor M1 may be connected to a first node N1. The first transistor M1 may control the amount of the driving current supplied from the first driving power voltage VDD to the second driving power voltage VSS via the light emitting element LD in response to a voltage of the first node N1.

The second transistor M2 may be connected between the j-th data line DLj and a second node N2. For example, a gate electrode of the second transistor M2 may be connected to the first scan line SL1*i*. The second transistor M2 may be turned on to electrically connect the j-th data line DLj and the second node N2 in case that a first scan signal GW is supplied to the first scan line SL1*i*.

The third transistor M3 may be connected between the second node N2 and the third node N3 (or a first electrode of the light emitting element LD). For example, a gate electrode of the third transistor M3 may be connected to the second scan line SL2*i*. The third transistor M3 may be turned on to electrically connect the second node N2 and the third node N3 in case that a second scan signal GR is supplied to the second scan line SL2*i*.

The fourth transistor M4 may be connected between the first node N1 and the fourth node N4. For example, a gate electrode of the fourth transistor M4 may be connected to the third scan line SL3*i*. The fourth transistor M4 may be turned on to electrically connect the first node N1 and the fourth node N4 in case that a third scan signal GC is supplied to the third scan line SL3*i*. For example, the gate electrode (e.g., the first node N1) and the second electrode (e.g., the fourth node N4) of the first transistor M1 may be electrically connected, and thus the first transistor M1 may be connected in a form of a diode.

The fifth transistor M5 may be connected between the fourth node N4 and the third node N3. For example, a gate electrode of the fifth transistor M5 may be connected to the first emission control line EL1*k*. The fifth transistor M5 may be turned off in case that a first emission control signal EM1 is supplied to the first emission control line EL1*k*. The fifth transistor M5 may be turned on in case that the first emission control signal EM1 is not supplied. In case that the fifth transistor M5 is turned off, the light emitting element LD and the first transistor M1 may be electrically cut off, and thus the light emitting element LD may be set to a non-emission state.

The first capacitor C1 may be connected between the first power line PL1 and the first node N1. The first capacitor C1 may store a voltage applied to the first node N1.

The second capacitor C2 may be connected between the first node N1 and the second node N2. The second capacitor C2 may change the voltage of the first node N1 in response to a voltage of the second node N2. For example, the second capacitor C2 may be driven as a coupling capacitor.

Figure 4:
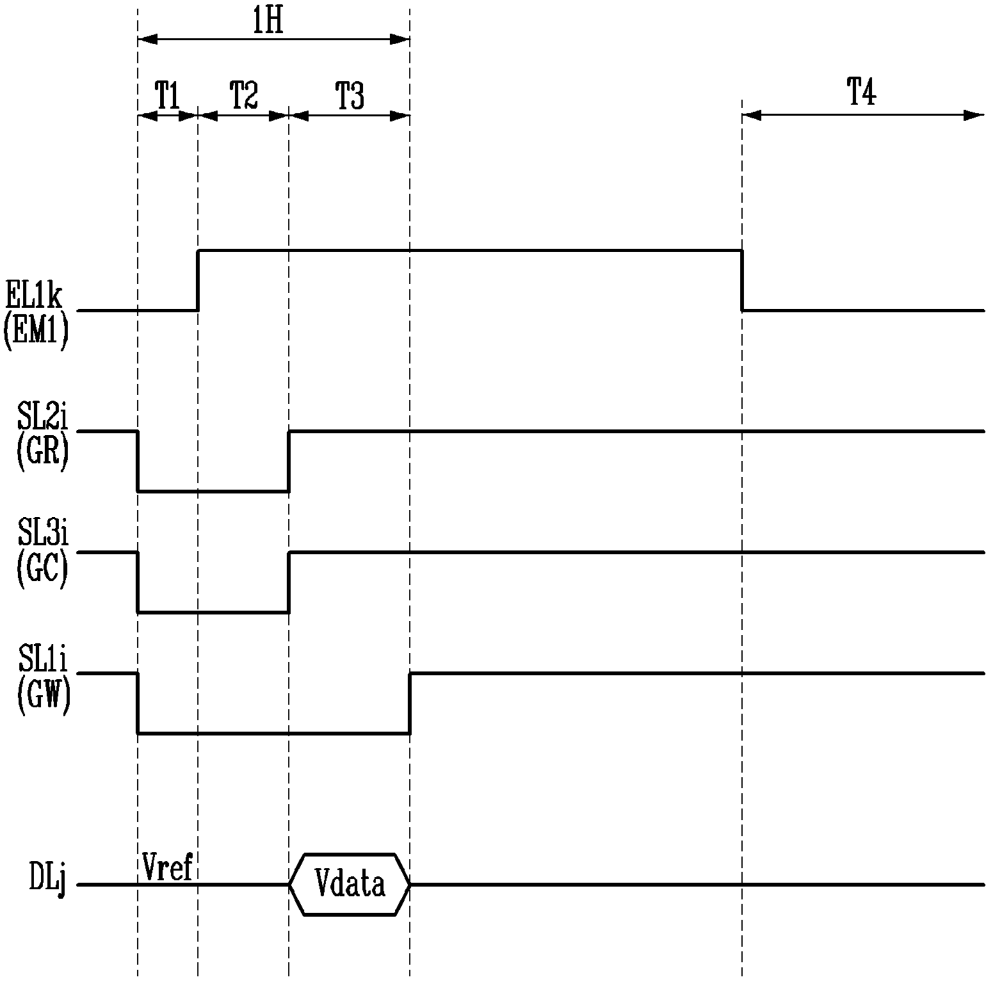
FIG. 4 is a waveform diagram illustrating an embodiment of a method of driving the pixel shown in FIG. 3.

FIG. 4 is a waveform diagram illustrating an embodiment of a method of driving the pixel shown in FIG. 3.

Referring to FIG. 4, in an embodiment, a horizontal period 1H (or a specific horizontal period), in which the data signal is supplied to the pixel PXij positioned on the i-th horizontal line and the j-th vertical line, may be divided into a first period T1, a second period T2, and a third period T3.

The data driver 140 may supply the reference power voltage Vref to the j-th data line DLj during the first period T1 and the second period T2, and supply a voltage Vdata of the data signal during the third period T3. The reference power voltage Vref may be set to a voltage that turns off the light emitting element LD in case that the reference power voltage Vref is supplied to the first electrode (or the third node N3) of the light emitting element LD. For example, the reference power voltage Vref may be set to a voltage between the first driving power voltage VDD and the second driving power voltage VSS. The voltage Vdata of the data signal may be set to various voltages in correspondence with a grayscale.

The scan driver 130 may supply the first scan signal GW to the first scan line SL1*i* during the first to third periods T1 to T3. The scan driver 130 may supply the second scan signal GR to the second scan line SL2*i* and supply the third scan signal GC to the third scan line SL3*i* during the first period T1 and the second period T2.

The first emission driver 150 may supply the first emission control signal EM1 to the first emission control line EL1*k* during the second period T2 and the third period T3. The first emission control signal EM1 may be supplied before a fourth period T4.

The first period T1 may be a period in which the first node N1, the second node N2, the third node N3, and the fourth node N4 are initialized by the reference power voltage Vref. During the first period T1, the first capacitor C1, the second capacitor C2, and the first electrode of the light emitting element LD may be initialized by the reference power voltage Vref. The first period T1 may be referred to as an initialization period.

The second period T2 may be a period in which a voltage corresponding to a threshold voltage of the first transistor M1 is stored in the first capacitor C1. The second period T2 may be referred to as a threshold voltage compensation period or a compensation period.

The third period T3 may be a period in which the voltage Vdata of the data signal is supplied from the j-th data line DLj to the pixel PXij. The voltage corresponding to the data signal may be applied to the first node N1 during the third period T3. The third period T3 may be referred to as a data writing period.

During the fourth period T4 after the third period T3, the first transistor M1 may control the amount of the driving current supplied from the first driving power voltage VDD to the second driving power voltage VSS via the light emitting element LD in response to the voltage of the first node N1. For example, during the fourth period T4, the light emitting element LD may emit light with a luminance corresponding to the amount of the driving current. The fourth period T4 may be referred to as an emission period.

FIGS. 5A to 5D are schematic diagrams illustrating an embodiment of an operation process of the pixel corresponding to a driving waveform of FIG. 4.

Figure 5A:
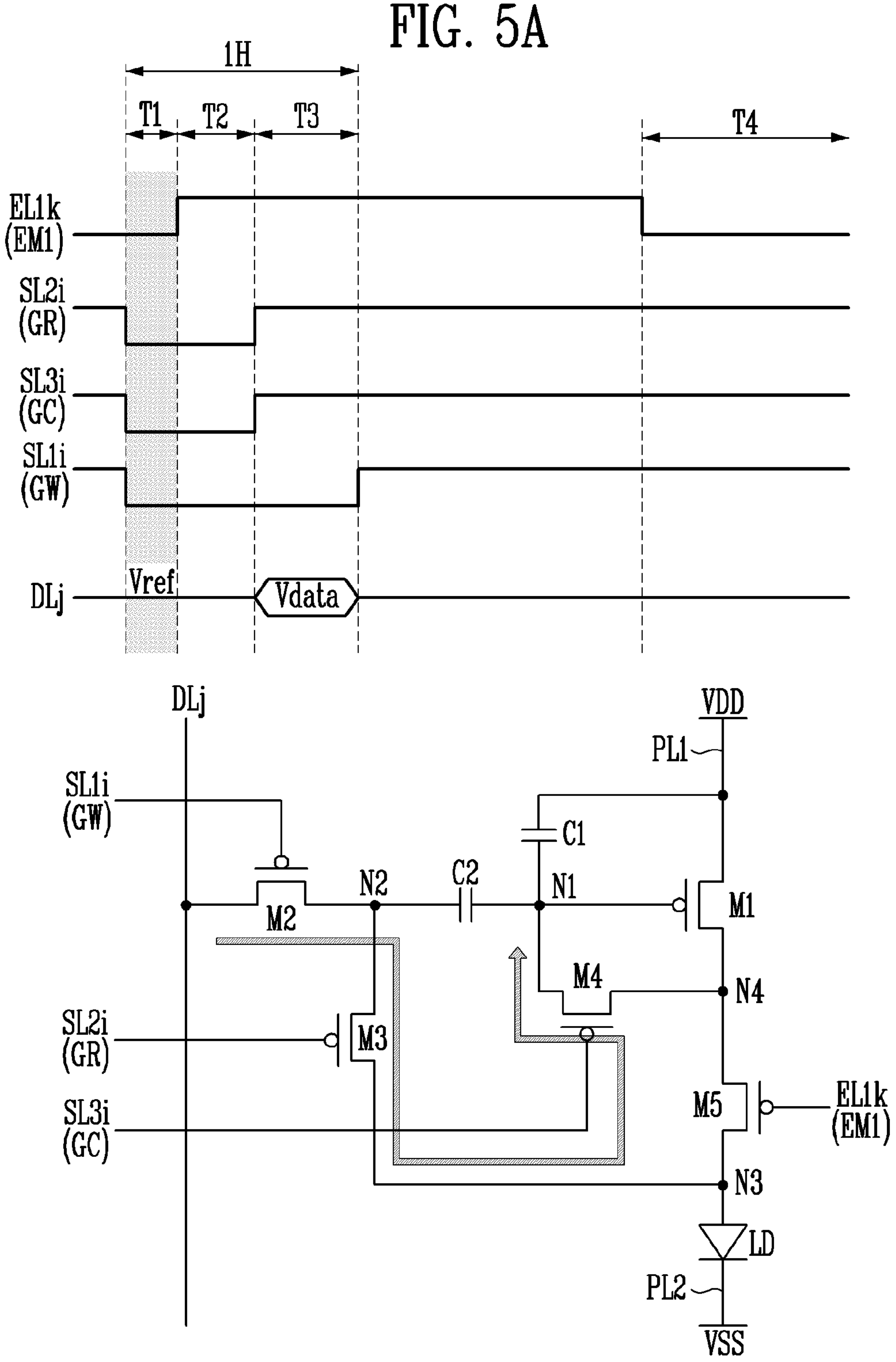
FIGS. 5A, 5B, 5C, and 5D are schematic diagrams illustrating an embodiment of an operation process of the pixel corresponding to a driving waveform of FIG. 4.

Referring to FIG. 5A, during the first period T1, the first emission control signal EM1 may not be supplied to the first emission control line EL1*k*. For example, during the first period T1, the first emission control line EL1*k* may be set to a gate-on voltage, and thus the fifth transistor M5 may maintain a turn-on state.

During the first period T1, the first scan signal GW may be supplied to the first scan line SL1*i*, the second scan signal GR may be supplied to the second scan line SL2*i*, and the third scan signal GC may be supplied to the third scan line SL3*i*.

In case that the first scan signal GW is supplied to the first scan line SL1*i*, the second transistor M2 may be turned on. In case that the second transistor M2 is turned on, the j-th data line DLj and the second node N2 may be electrically connected to each other.

In case that the second scan signal GR is supplied to the second scan line SL2*i*, the third transistor M3 may be turned on. In case that the third transistor M3 is turned on, the second node N2 and the third node N3 may be electrically connected to each other.

In case that the third scan signal GC is supplied to the third scan line SL3*i*, the fourth transistor M4 may be turned on. In case that the fourth transistor M4 is turned on, the first node N1 and the fourth node N4 may be electrically connected to each other.

During the first period T1, the reference power voltage Vref may be supplied to the j-th data line DLj. The reference power voltage Vref supplied to the j-th data line DLj may be supplied to the second node N2, the third node N3, the fourth node N4, and the first node N1. For example, during the first period T1, the first to fourth nodes N1 to N4 may be initialized by the reference power voltage Vref.

Since the reference power voltage Vref is supplied to the first node N1 during the first period T1, the first capacitor C1 may be initialized by the reference power voltage Vref regardless of a voltage supplied in a previous period (or a previous frame period). Since the reference power voltage Vref is supplied to the first node N1 and the second node N2 during the first period T1, the second capacitor C2 may be initialized by the reference power voltage Vref regardless of the voltage supplied in the previous frame period.

In case that the reference power voltage Vref is supplied to the third node N3 during the first period T1, the first electrode of the light emitting element LD may be initialized by the reference power voltage Vref. For example, the reference power voltage Vref may be set so that the light emitting element LD may be turned off, and thus the light emitting element LD may be set to a turn-off state during the first period T1.

Figure 5B:
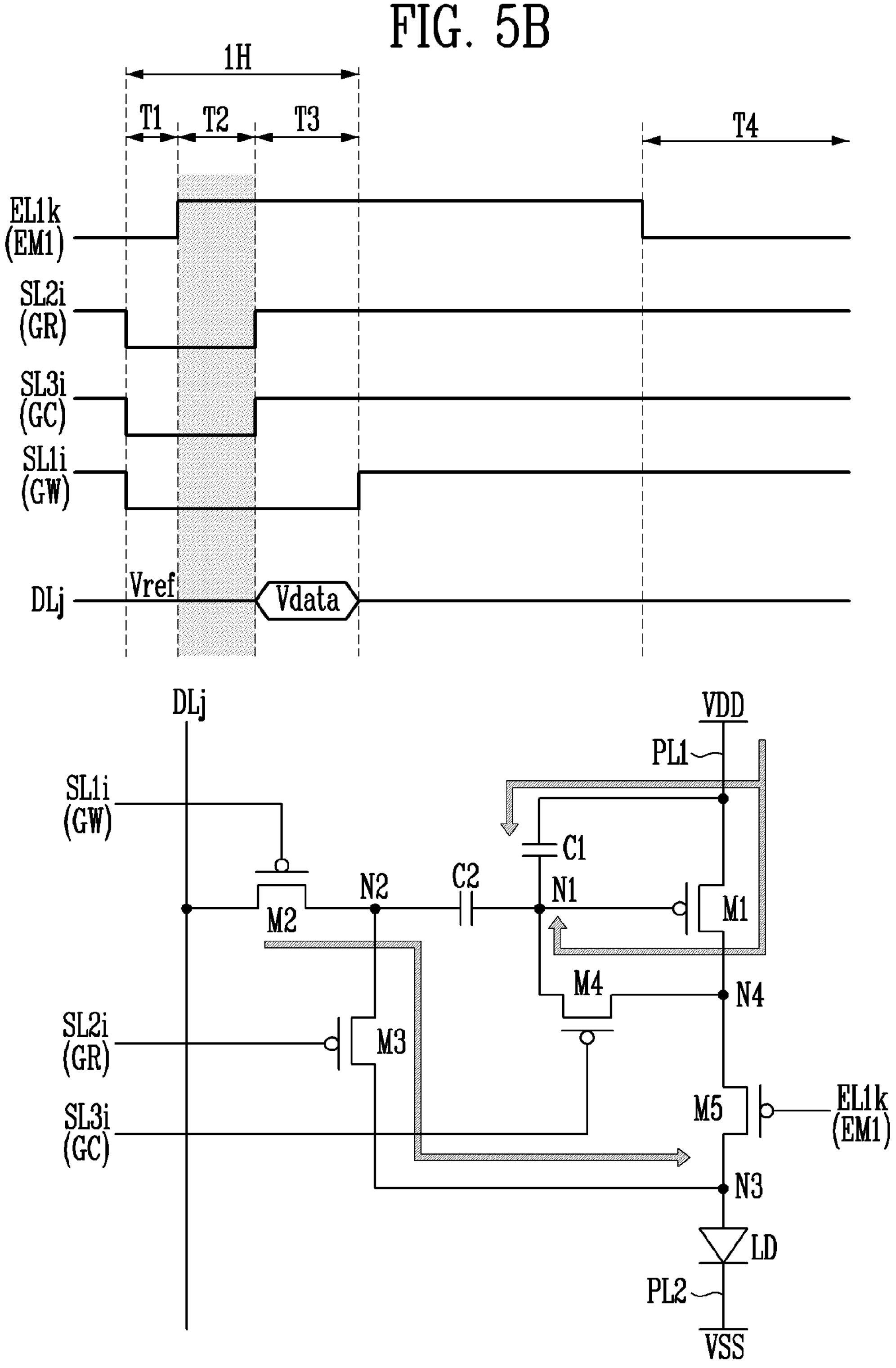

Referring to FIG. 5B, during the second period T2, the first emission control signal EM1 may be supplied to the first emission control line EL1*k*. In case that the first emission control signal EM1 is supplied to the first emission control line EL1*k*, the fifth transistor M5 may be turned off. In case that the fifth transistor M5 is turned off, electrical connection between the third node N3 and the fourth node N4 may be cut off.

During the second period T2, the first scan signal GW may be supplied to the first scan line SL1*i*, the second scan signal GR may be supplied to the second scan line SL2*i*, and the third scan signal GC may be supplied to the third scan line SL3*i*.

In case that the first scan signal GW is supplied, the second transistor M2 may maintain a turn-on state, and in case that the second scan signal GR is supplied, the third transistor M3 may maintain a turn-on state. Then, the reference power voltage Vref from the j-th data line DLj may be supplied to the second node N2 and the third node N3. At this time, the light emitting element LD may maintain a turn-off state.

In case that the third scan signal GC is supplied, the fourth transistor M4 may maintain a turn-on state. In case that the fourth transistor M4 is turned on, the first transistor M1 may be connected in the diode form. In case that the first transistor M1 is connected in the diode form, the voltage of the first node N1 may be set to a voltage obtained by subtracting an absolute value threshold voltage of the first transistor M1 from the first driving power voltage VDD. For example, the voltage of the first node N1 may be increased from the reference power voltage Vref to the voltage obtained by subtracting the absolute value threshold voltage of the first transistor M1 from the first driving power voltage VDD.

In case that the voltage of the first node N1 is set to the voltage obtained by subtracting the absolute value threshold voltage of the first transistor M1 from the first driving power voltage VDD, a voltage corresponding to the threshold voltage of the first transistor M1 may be stored in the first capacitor C1. For example, during the second period T2, the voltage corresponding to the threshold voltage of the first transistor M1 may be stored in the first capacitor C1.

Figure 5C:
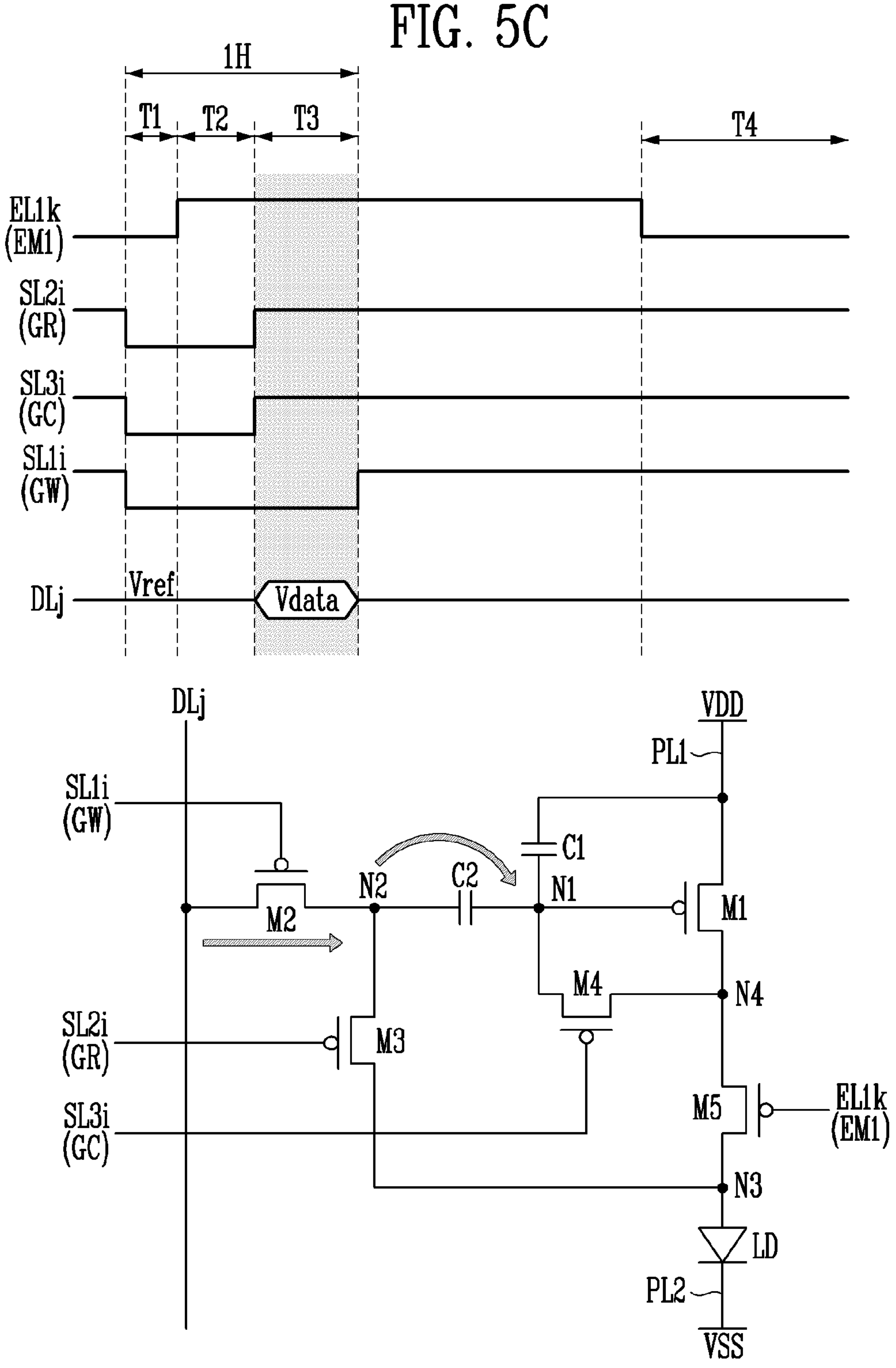

Referring to FIG. 5C, during the third period T3, the supply of the second scan signal GR to the second scan line SL2*i* may be stopped, and the supply of the third scan signal GC to the third scan line SL3*i* may be stopped.

In case that the supply of the second scan signal GR to the second scan line SL2*i* is stopped, the third transistor M3 may be turned off. In case that the third transistor M3 is turned off, the second node N2 and the third node N3 may be electrically cut off.

In case that the supply of the third scan signal GC to the third scan line SL3*i* is stopped, the fourth transistor M4 may be turned off. In case that the fourth transistor M4 is turned off, the first node N1 and the fourth node N4 may be electrically cut off.

During the third period T3, the first scan signal GW may be supplied to the first scan line SL1*i*. In case that the first scan signal GW is supplied to the first scan line SL1*i*, the second transistor M2 may maintain a turn-on state.

During the third period T3, the voltage Vdata of the data signal may be supplied to the j-th data line DLj. The voltage Vdata of the data signal supplied to the j-th data line DLj may be supplied to the second node N2 via the second transistor M2.

In case that the voltage Vdata of the data signal is supplied to the second node N2, the voltage of the second node N2 may be changed from the reference power voltage Vref to the voltage Vdata of the data signal. At this time, the voltage of the first node N1 may be also changed in correspondence with an amount of a voltage change of the second node N2 by coupling of the second capacitor C2.

For example, an amount of a voltage change of the first node N1 may be determined in correspondence with a ratio of the first capacitor C1 and the second capacitor C2. For example, the voltage of the first node N1 may change from a voltage obtained by subtracting the absolute value threshold voltage of the first transistor M1 from the first driving power voltage VDD, by a value obtained by multiplying the amount of the voltage change of the second node N2 by C2/(C1+C2). As described above, in case that the amount of the voltage change of the first node N1 is controlled by the ratio of the first capacitor C1 and the second capacitor C2, a voltage range of the data signal may be sufficiently wide.

For example, in case that the data signal is supplied (e.g., directly supplied) to the gate electrode of the first transistor M1, the voltage range of the data signal may be set to be relatively narrow. In case that the data signal is supplied (e.g., directly supplied) to the gate electrode of the first transistor M1, the voltage range of the data signal may be set to 1 V or less. In case that the data signal has a narrow voltage range, various grayscales (for example, 256 grayscales) may be required to be implemented by using the narrow voltage range, and thus accurately expressing a grayscale may be difficult.

However, according to an embodiment, in case that the voltage supplied to the gate electrode of the first transistor M1 is controlled by the ratio of the first capacitor C1 and the second capacitor C2, the voltage range of the data signal may be set sufficiently wide. For example, a voltage corresponding to a value obtained by multiplying the voltage of the data signal by C2/(C1+C2) may be transferred to the gate electrode of the first transistor M1, and thus the voltage range of the data signal may be set wide. In case that the data signal has a wide voltage range, a grayscale may be readily implemented.

During the third period T3, the first capacitor C1 may store the voltage of the first node N1. For example, the voltage of the first node N1 may be determined by the threshold voltage of the first transistor M1 and the voltage Vdata of the data signal, and thus a voltage corresponding to the data signal and the threshold voltage of the first transistor M1 may be stored in the first capacitor C1 during the third period T3.

Figure 5D:
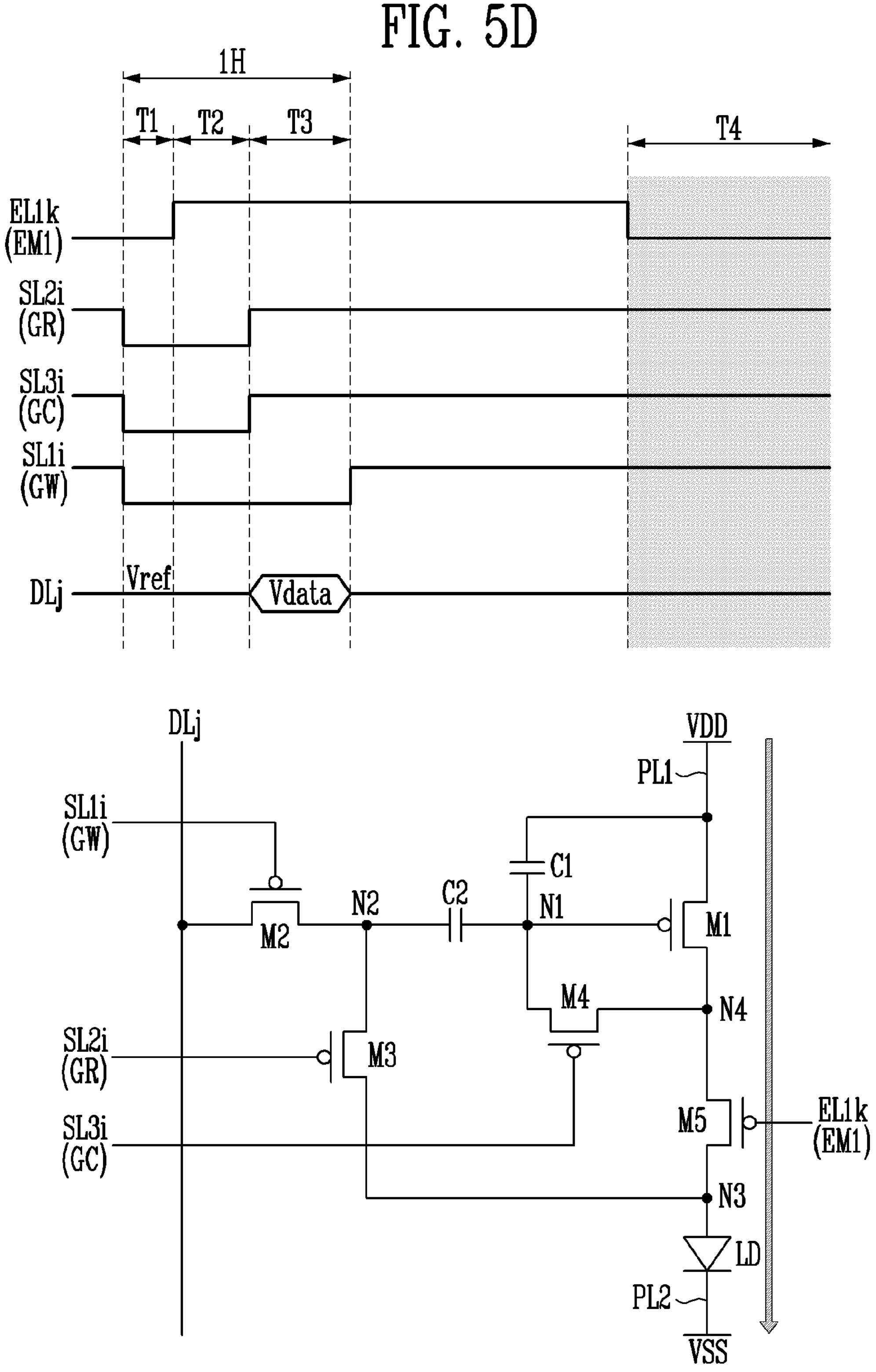

Referring to FIG. 5D, during the fourth period T4 after the third period T3, the supply of the first emission control signal EM1 to the first emission control line EL1*k* may be stopped. In case that supply of the first emission control signal EM1 to the first emission control line EL1*k* is stopped, the fifth transistor M5 may be turned on. At this time, the first transistor M1 may control the amount of the driving current supplied from the first driving power voltage VDD to the light emitting element LD in response to the voltage of the first node N1. During the fourth period T4, the light emitting element LD may generate light of a luminance corresponding to the amount of the driving current supplied from the first transistor M1.

Figure 6:
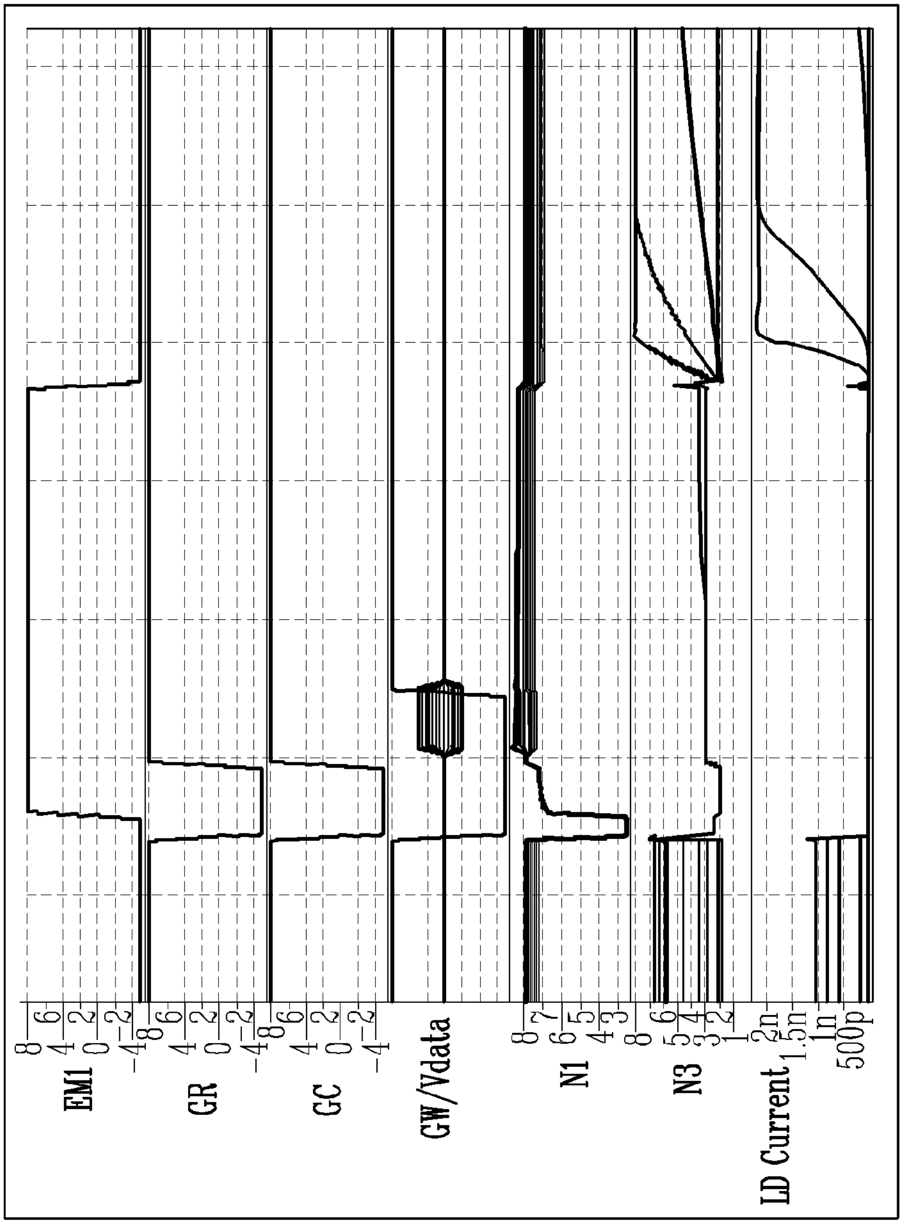
FIG. 6 is a schematic diagram illustrating a simulation result corresponding to the driving waveform of FIG. 4.

FIG. 6 is a schematic diagram illustrating a simulation result corresponding to the driving waveform of FIG. 4. In FIG. 6, N1 means the gate electrode of the first transistor M1, N3 means the anode electrode of the light emitting element LD, and LD Current means the driving current.

Referring to FIG. 6, the pixel PXij according to an embodiment may be stably driven in correspondence with the driving waveform of FIG. 4. For example, the voltage of the first node N1 may be changed in correspondence with the voltage Vdata of the data signal.

In an embodiment, in case that the voltage Vdata of the data signal is supplied to the second node N2, a voltage supplied to the gate electrode of the first transistor M1 may be controlled by the ratio of the first capacitor C1 and the second capacitor C2. For example, the voltage range of the data signal may be set sufficiently wide. For example, the data signal may be set to have a voltage range of 2 V or higher.

Figure 7:
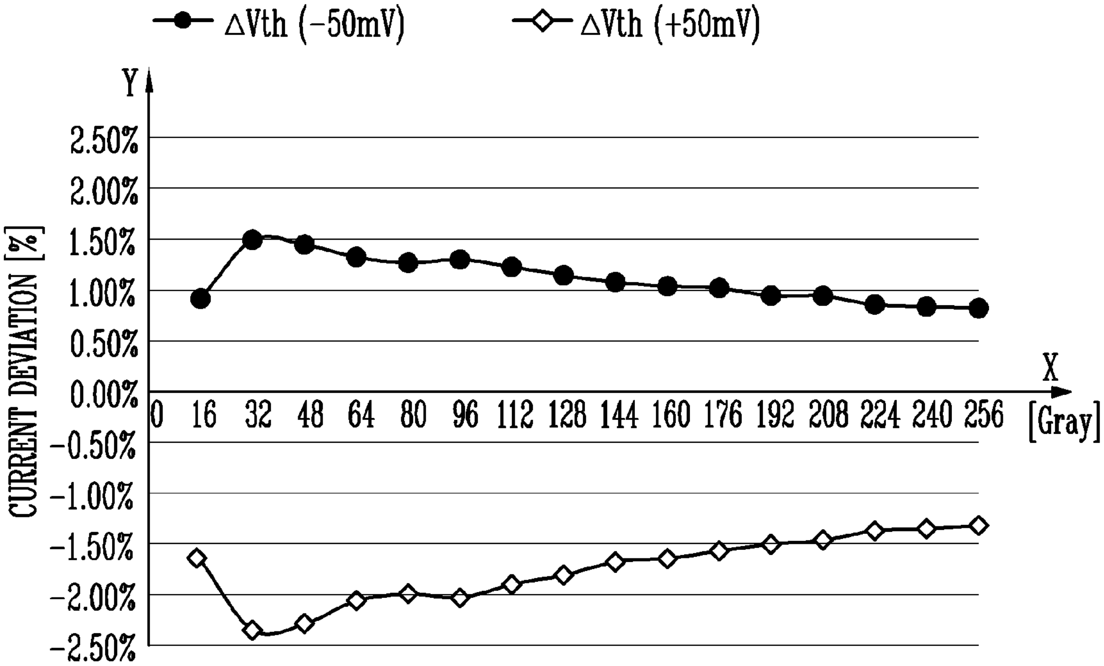
FIG. 7 is a schematic diagram illustrating a current deviation of the pixel shown in FIG. 3.

FIG. 7 is a schematic diagram illustrating a current deviation of the pixel shown in FIG. 3. In FIG. 7, an X-axis denotes a grayscale and a Y-axis denotes the current deviation. The current deviation indicates a change amount of the driving current corresponding to a change of the threshold voltage Vth of the first transistor M1 as a percentage [%]. For example, FIG. 7 illustrates the current deviation in case that the threshold voltage Vth of the first transistor M1 is changed to −50 mV and +50 mV.

Referring to FIG. 7, in case that the threshold voltage Vth of the first transistor M1 is changed to −50 mV and +50 mV, the current deviation may be set to approximately −2.35% to 1.49%. For example, in a case of an embodiment, the threshold voltage Vth of the first transistor M1 may be stably compensated.

Figure 8:
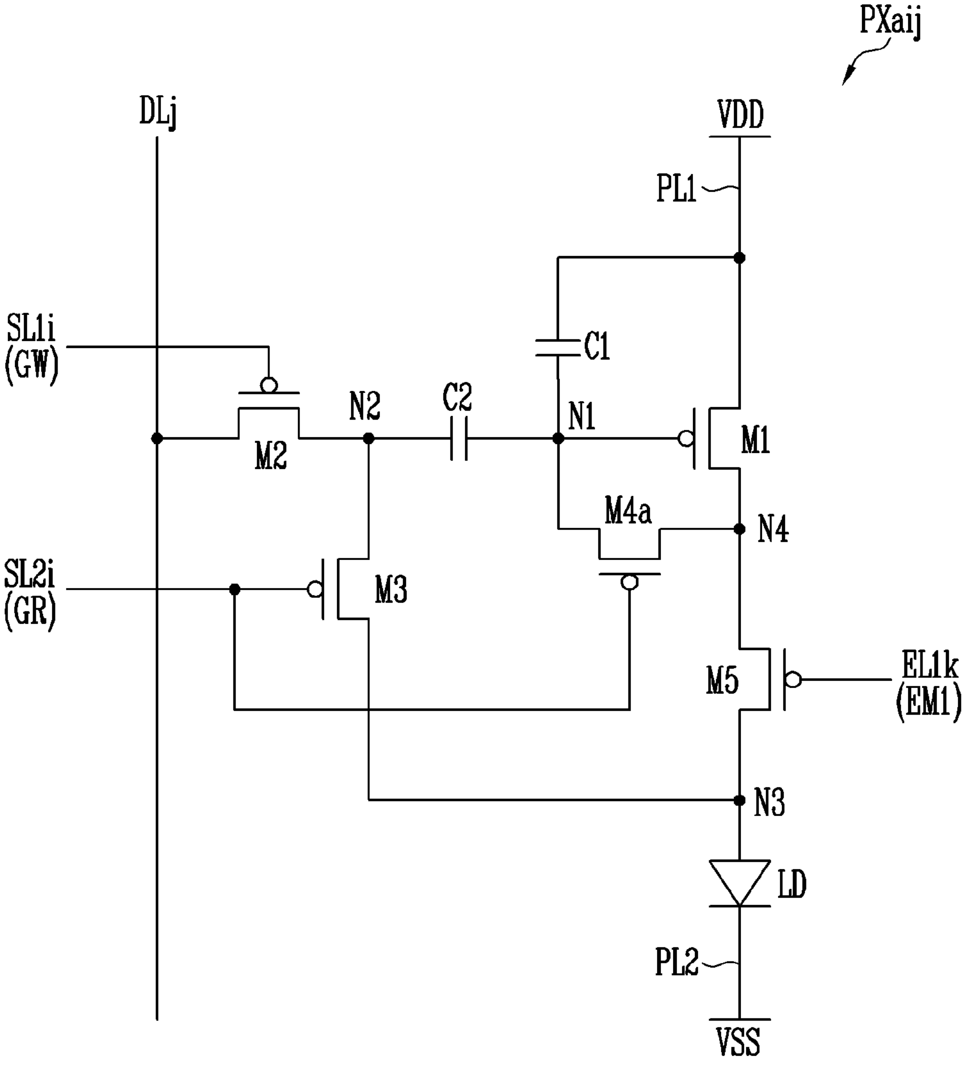
FIG. 8 is a schematic diagram illustrating a pixel according to an embodiment.

FIG. 8 is a schematic diagram illustrating a pixel according to an embodiment. The description of FIG. 8, which are similar to or same as that of FIG. 3, is omitted for descriptive convenience.

Referring to FIG. 8, the pixel PXaij according to an embodiment may be connected to corresponding signal lines SL1*i*, SL2*i*, EL1*k*, and DLj. For example, the pixel PXaij may be connected to the i-th first scan line SL1*i*, the i-th second scan line SL2*i*, the k-th first emission control line EL1*k*, and the j-th data line DLj. In an embodiment, the pixel PXaij may be further connected to the first power line PL1 and the second power line PL2.

The pixel PXaij according to an embodiment may include the light emitting element LD and the pixel circuit for controlling the amount of the current supplied to the light emitting element LD.

The pixel circuit may include the first transistor M1, the second transistor M2, the third transistor M3, a fourth transistor M4*a*, the fifth transistor M5, the first capacitor C1, and the second capacitor C2.

The third transistor M3 may be connected between the second node N2 and the third node N3 (or the first electrode of the light emitting element LD). For example, the gate electrode of the third transistor M3 may be connected to the second scan line SL2*i*. The third transistor M3 may be turned on to electrically connect the second node N2 and the third node N3 in case that the second scan signal GR is supplied to the second scan line SL2*i*.

The fourth transistor M4*a* may be connected between the first node N1 and the fourth node N4. For example, a gate electrode of the fourth transistor M4*a* may be connected to the second scan line SL2*i*. The fourth transistor M4*a* may be turned on to electrically connect the first node N1 and the fourth node N4 in case that the second scan signal GR is supplied to the second scan line SL2*i*.

The fourth transistor M4*a* included in the pixel PXaij according to an embodiment may be connected to the same second scan line SL2*i* as the third transistor M3.

As shown in FIG. 4, the second scan signal GR supplied to the second scan line SL2*i* and the third scan signal GC supplied to the third scan line SL3*i* may be supplied in the same waveform. Therefore, the second scan line SL2*i* and the third scan line SL3*i* may be set as a single scan line (for example, the second scan line SL2*i*).

A method of driving the pixel PXaij shown in FIG. 8 is the same as that of the pixel PXij shown in FIG. 3, and thus a description of the driving method is omitted for descriptive convenience.

Figure 9:
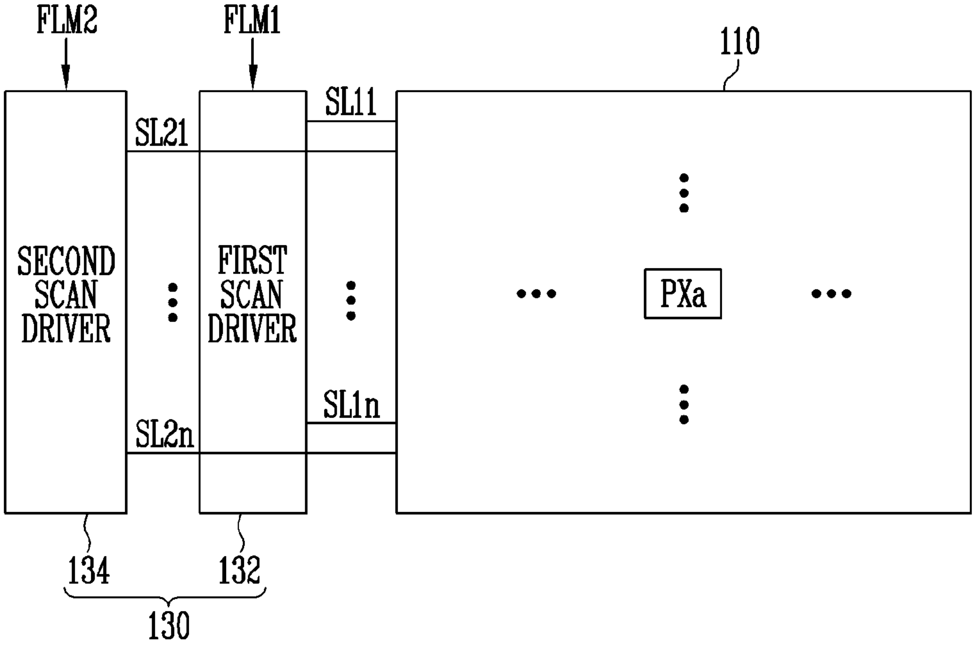
FIG. 9 is a schematic diagram illustrating an embodiment of a scan driver for supplying a scan signal to the pixel of FIG. 8.

FIG. 9 is a schematic diagram illustrating an embodiment of a scan driver for supplying a scan signal to the pixel of FIG. 8.

Referring to FIG. 9, the scan driver 130 may include the first scan driver 132 and the second scan driver 134.

The first scan driver 132 may receive the first scan start signal FLM1 and generate the first scan signal GW by shifting the first scan start signal FLM1 in response to the clock signal. The first scan driver 132 may sequentially supply the first scan signal GW to the first scan lines SL11 to SL1*n*.

The second scan driver 134 may receive the second scan start signal FLM2 and generate the second scan signal GR by shifting the second scan start signal FLM2 in response to the clock signal. The second scan driver 134 may sequentially supply the second scan signal GR to the second scan lines SL21 to SL2*n*.

The first scan signal GW and the second scan signal GR may be set to a gate-on voltage so that a transistor included in pixels PXa may be turned on. For example, the first scan signal GW and the second scan signal GR may be set to a low level voltage in correspondence with the P-type transistor.

The scan driver 130 shown in FIG. 9 may not include the third scan driver 136 shown in FIG. 2, and thus a manufacturing cost and the like may be reduced.

Figure 10:
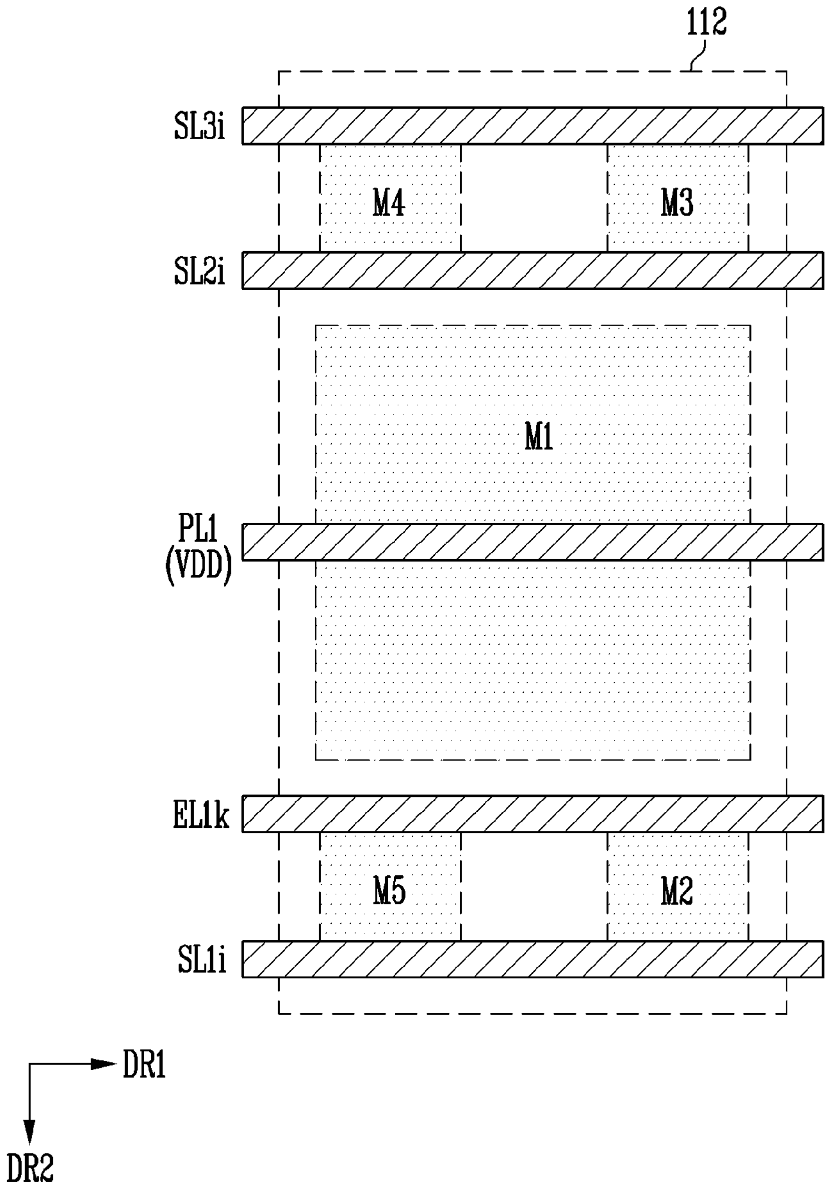
FIG. 10 is a schematic diagram illustrating an embodiment of a disposition of transistors shown in FIG. 3.

FIG. 10 is a schematic diagram illustrating an embodiment of a disposition of the transistors shown in FIG. 3.

Referring to FIG. 10, in a pixel area 112, the third scan line SL3*i*, the second scan line SL2*i*, the first power line PL1, the first emission control line EL1*k*, and the first scan line SL1*i* may extend in a first direction DR1 and may be spaced apart in a second direction DR2. For example, the first direction DR1 may be set in the same direction as a horizontal line, and the second direction DR2 may be set in the same direction as a vertical line. The pixel area 112 may refer to an area where the pixel circuit included in the pixel PXij is formed.

In an embodiment, the first scan line SL1*i*, the second scan line SL2*i*, the third scan line SL3*i*, the first power line PL1, and the first emission control line EL1*k* may be formed of the same metal layer. In an embodiment, the first scan line SL1*i*, the second scan line SL2*i*, the third scan line SL3*i*, and the first emission control line EL1*k* may be formed of a first metal layer, and the first power line PL1 may be formed of a second metal layer different from the first metal layer. For example, the second metal layer may include the first metal layer and another metal layer. The first scan line SL1*i*, the second scan line SL2*i*, the third scan line SL3*i*, the first power line PL1, and the first emission control line EL1*k* may be connected to corresponding transistors (e.g., at least one of M1 to M5) by contact holes.

The first transistor M1 may be positioned in a central portion of the pixel area 112. The first transistor M1 may be mounted/disposed on a relatively large area as compared to the other transistors M2 to M5. For example, the first transistor M1 may be formed to have a size larger than that of the other transistors M2 to M5. The first transistor M1 may be connected to the first power line PL1 through a contact hole.

The second transistor M2 and the fifth transistor M5 may be positioned on (or adjacent to) a side (e.g., lower side) of the first transistor M1. The fifth transistor M5 may be positioned on (or adjacent to) a part (e.g., left part) of the side of the first transistor M1 and may be connected to the first emission control line EL1*k* through a contact hole. The second transistor M2 may be positioned on (or adjacent to) another part (e.g., right part) of the side of the first transistor M1 and may be connected to the first scan line SL1*i* through a contact hole.

The third transistor M3 and the fourth transistor M4 may be positioned on (or adjacent to) another side (e.g., upper side) of the first transistor M1. The fourth transistor M4 may be positioned on (or adjacent to) a part (e.g., left part) of the another side of the first transistor M1 and may be connected to the third scan line SL3*i* through a contact hole. The third transistor M3 may be positioned on (or adjacent to) another part (e.g., right part) of the another side the first transistor M1 and may be connected to the second scan line SL2*i* through a contact hole.

Figure 11:
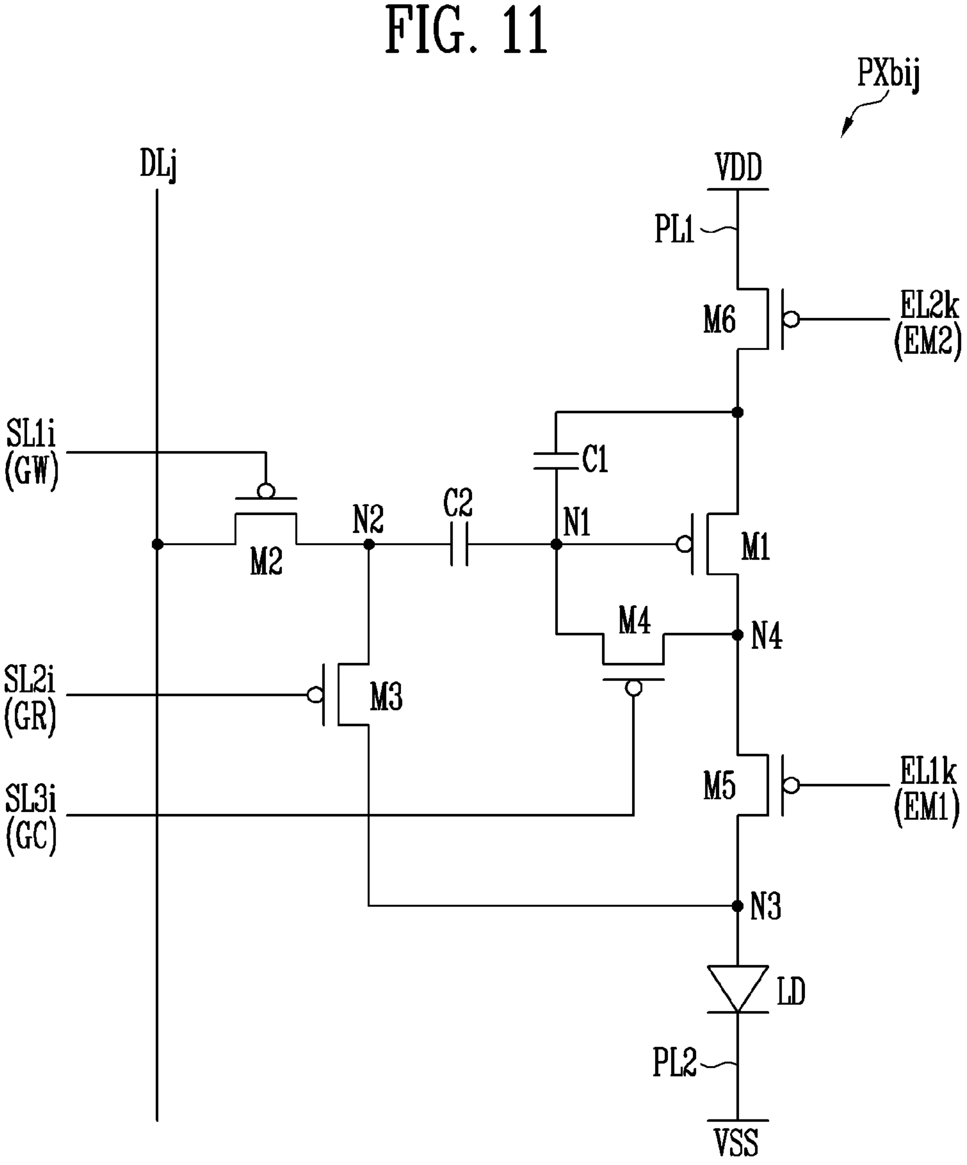
FIG. 11 is a schematic diagram illustrating a pixel according to an embodiment.

FIG. 11 is a schematic diagram illustrating a pixel according to an embodiment. The description of FIG. 11, which are similar to or same as that of FIG. 3, is omitted for descriptive convenience.

Referring to FIG. 11, a pixel PXbij according to an embodiment may be connected to corresponding signal lines SL1*i*, SL2*i*, SL3*i*, EL1*k*, EL2*k*, and DLj. For example, the pixel PXbij may be connected to the i-th first scan line SL1*i*, the i-th second scan line SL2*i*, the i-th third scan line SL3*i*, the k-th first emission control line EL1*k*, a k-th second emission control line EL2*k*, and the j-th data line DLj. In an embodiment, the pixel PXbij may be further connected to the first power line PL1 and the second power line PL2.

The pixel PXbij according to an embodiment may include the light emitting element LD and the pixel circuit for controlling the amount of the current supplied to the light emitting element LD.

The pixel circuit may include the first transistor M1, the second transistor M2, the third transistor M3, the fourth transistor M4, the fifth transistor M5, a sixth transistor M6, the first capacitor C1, and the second capacitor C2.

The sixth transistor M6 may be connected between the first power line PL1 and the first electrode of the first transistor M1. For example, a gate electrode of the sixth transistor M6 may be connected to the second emission control line EL2*k*. The sixth transistor M6 may be turned on in case that a second emission control signal EM2 is supplied to the second emission control line EL2*k*, and may be turned off in case that the second emission control signal EM2 is not supplied.

Compared to the pixel PXij of FIG. 3, the pixel PXbij of FIG. 11 may further include the sixth transistor M6. The sixth transistor M6 may be set to a turn-off state during a specific horizontal period 1H in which the data signal is supplied to the pixel PXbij, thereby preventing an unnecessary current from being supplied from the first driving power voltage VDD.

Figure 12:
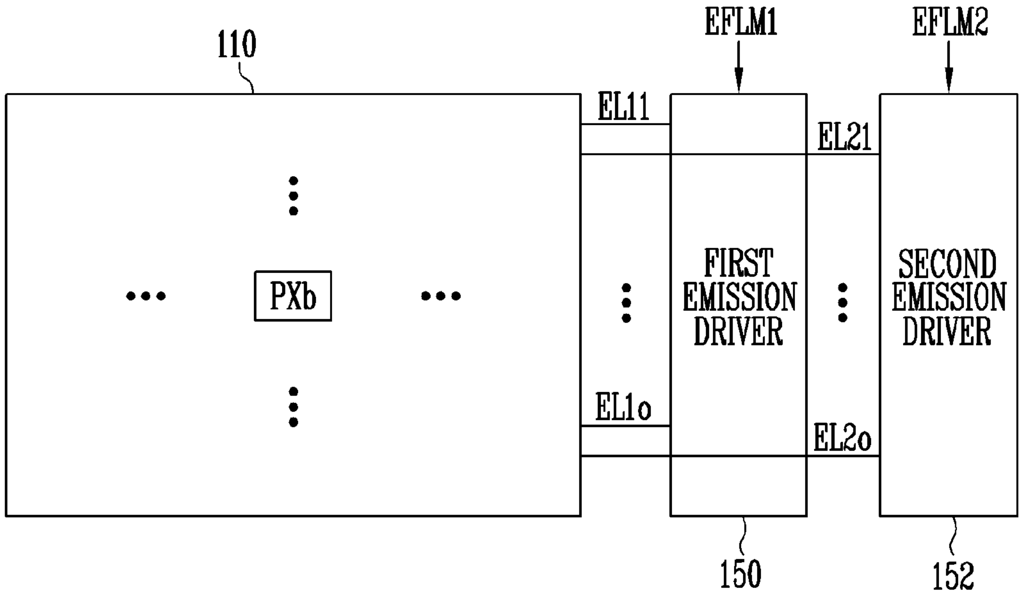
FIG. 12 is a schematic diagram illustrating an embodiment of emission drivers for supplying an emission control signal to the pixel of FIG. 11.

FIG. 12 is a schematic diagram illustrating an embodiment of emission drivers for supplying an emission control signal to the pixel of FIG. 11.

Referring to FIG. 12, the first emission driver 150 may receive a first emission start signal EFLM1 and generate the first emission control signal EM1 by shifting the first emission start signal EFLM1. The first emission driver 150 may sequentially supply the first emission control signal EM1 to the first emission control lines EL11 to EL1*o*. The first emission driver 150 may be the same driver as the first emission driver 150 shown in FIG. 1.

A second emission driver 152 may receive a second emission start signal EFLM2 and generate a second emission control signal EM2 by shifting the second emission start signal EFLM2. The second emission driver 152 may sequentially supply the second emission control signal EM2 to second emission control lines EL21 to EL20.

The first emission control signal EM1 and the second emission control signal EM2 may be set to a gate-off voltage so that transistors included in pixels PXb may be turned off. For example, the first emission control signal EM1 and the second emission control signal EM2 may be set to a high level voltage in correspondence with the P-type transistor.

Figure 13:
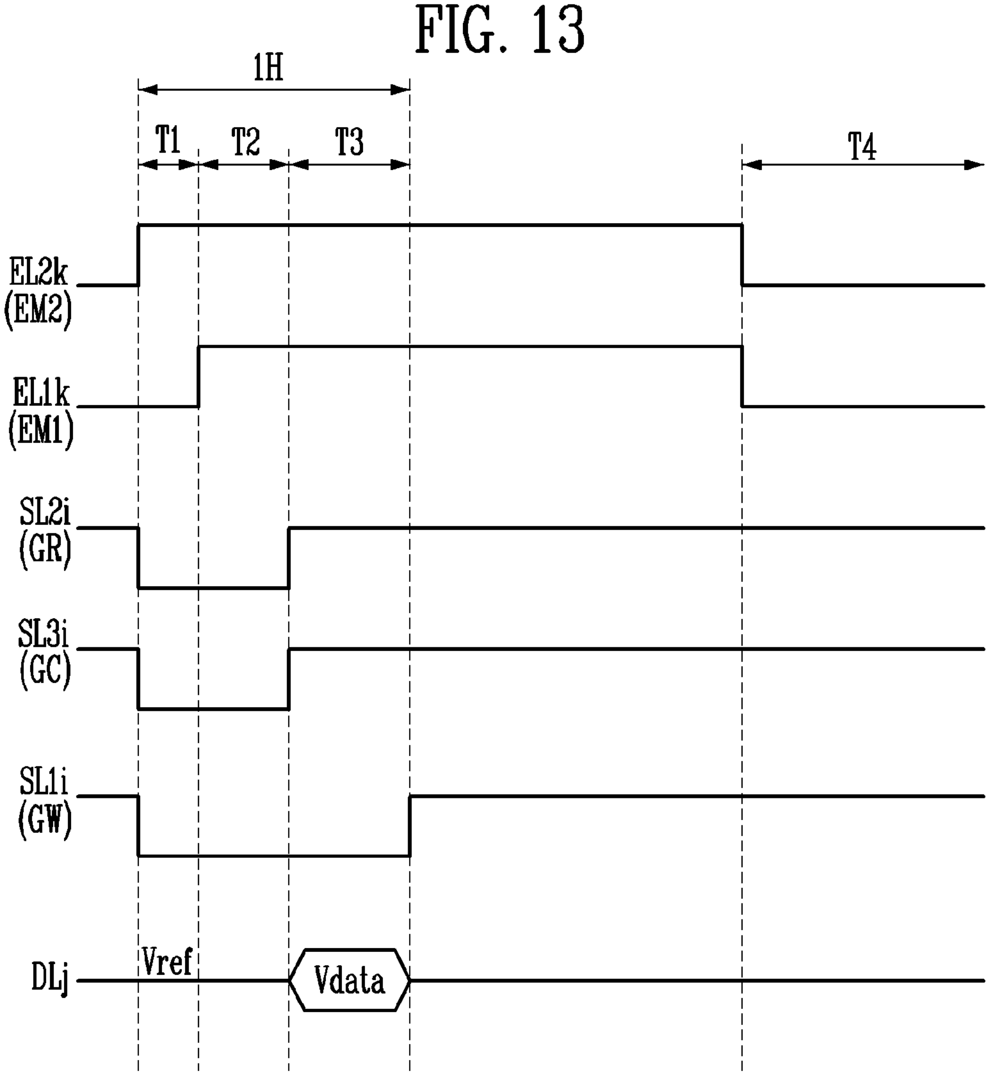
FIG. 13 is a schematic diagram illustrating an embodiment of a method of driving the pixel shown in FIG. 11.

FIG. 13 is a schematic diagram illustrating an embodiment of a method of driving the pixel shown in FIG. 11. The description of FIG. 13, which are similar to or same as that of FIG. 4, is omitted for descriptive convenience.

Referring to FIG. 13, in an embodiment, a horizontal period 1H (or a specific horizontal period) in which the data signal is supplied to the pixel PXbij positioned on the i-th horizontal line and the j-th vertical line may be divided into the first period T1, the second period T2, and the third period T3.

The second emission driver 152 may supply the second emission control signal EM2 to the second emission control line EL2*k* during the first to third periods T1 to T3. The second emission control signal EM2 may be supplied before the fourth period T4.

Figure 14A:
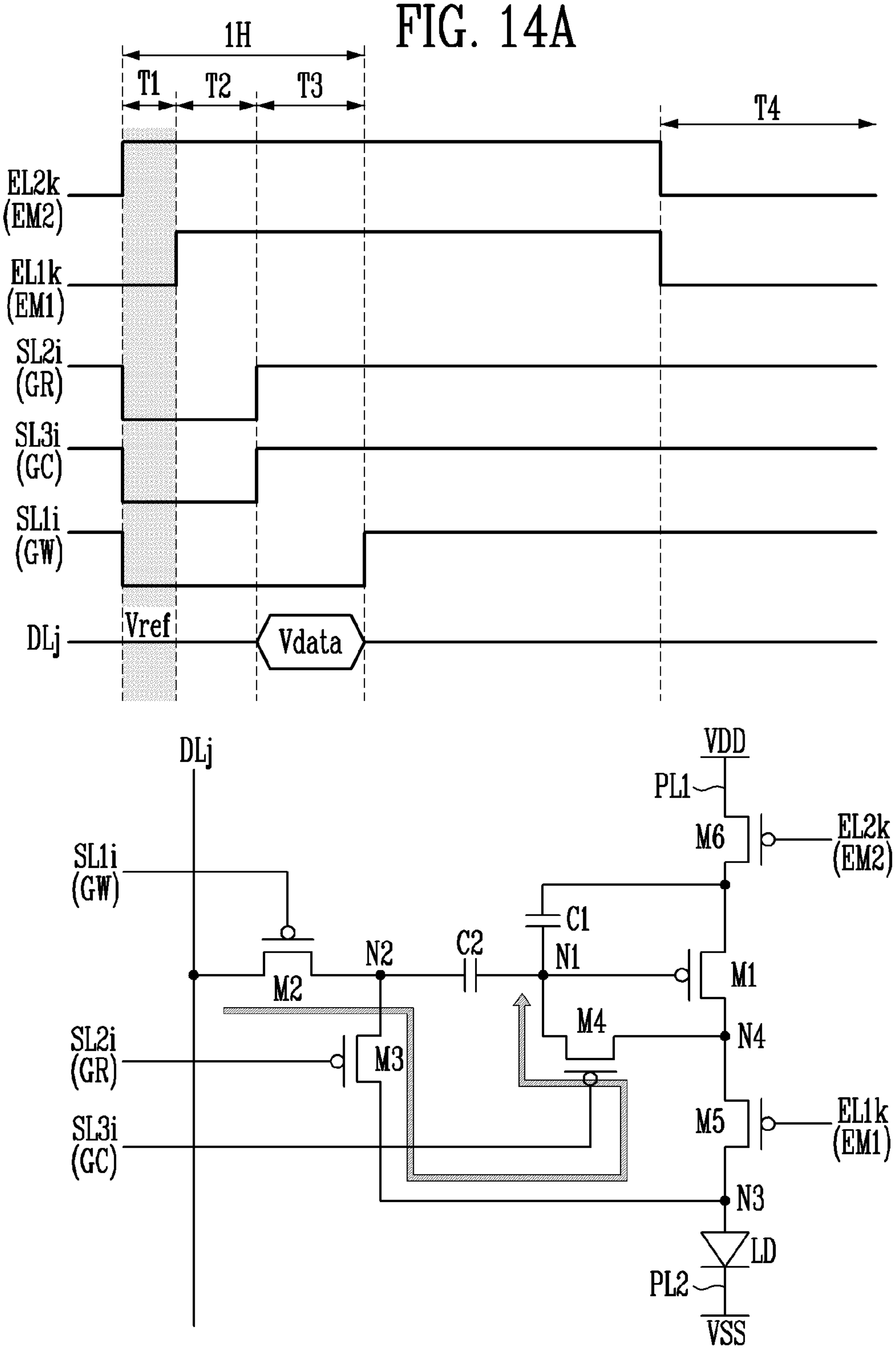
FIGS. 14A and 14B are schematic diagrams illustrating an embodiment of an operation process of the pixel corresponding to a driving waveform of FIG. 13.
Figure 14B:
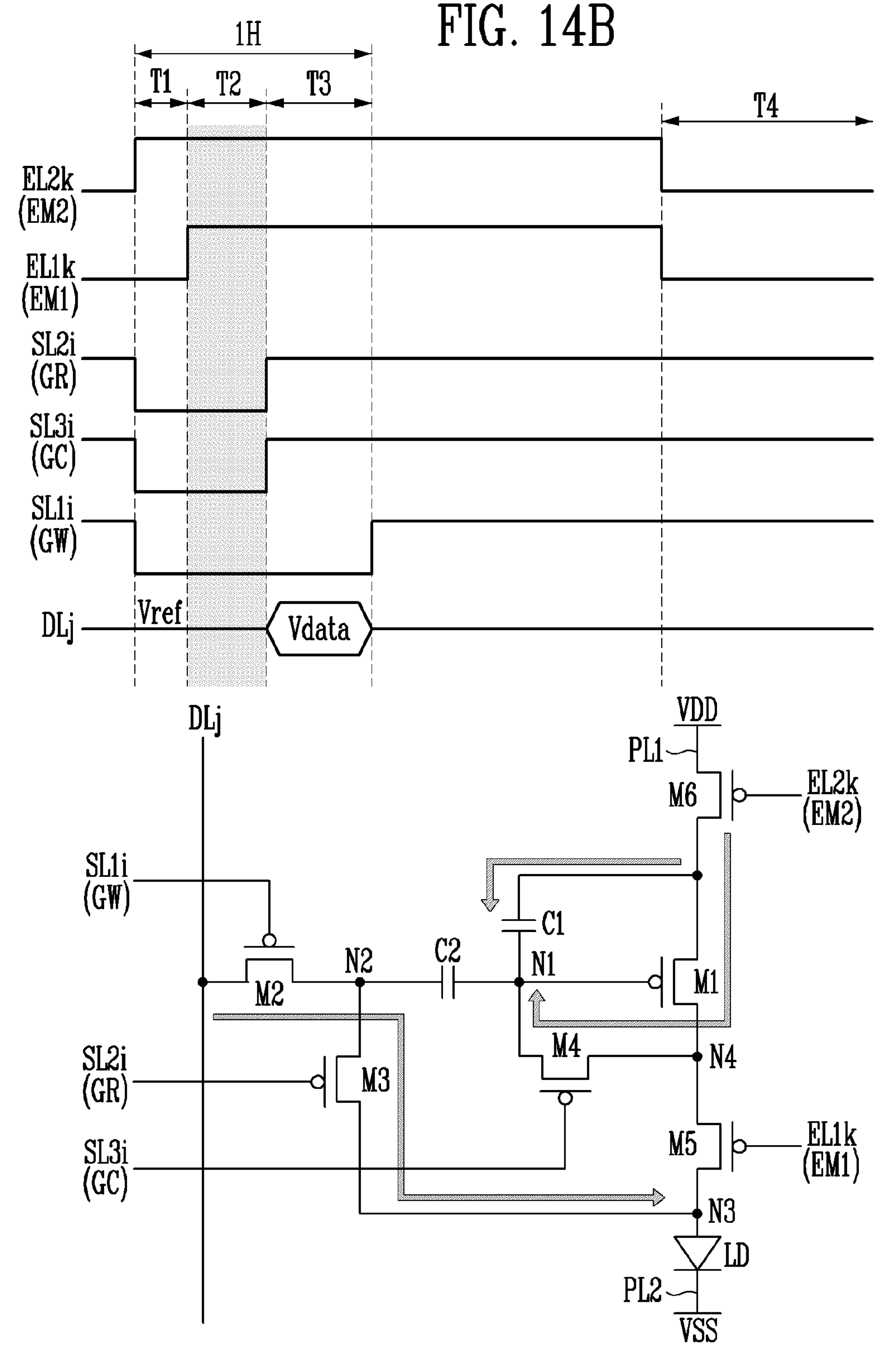

FIGS. 14A and 14B are schematic diagrams illustrating an embodiment of an operation process of the pixel corresponding to a driving waveform of FIG. 13.

Referring to FIG. 14A, during the first period T1, the first emission control signal EM1 may not be supplied to the first emission control line EL1*k*. For example, during the first period T1, the first emission control line EL1*k* may be set to a gate-on voltage, and thus the fifth transistor M5 may maintain a turn-on state.

During the first period T1, the second emission control signal EM2 may be supplied to the second emission control line EL2*k*. In case that the second emission control signal EM2 is supplied to the second emission control line EL2*k*, the sixth transistor M6 may be turned off.

During the first period T1, the first scan signal GW may be supplied to the first scan line SL1*i*, the second scan signal GR may be supplied to the second scan line SL2*i*, and the third scan signal GC may be supplied to the third scan line SL3*i*.

In case that the first scan signal GW is supplied to the first scan line SL1*i*, the second transistor M2 may be turned on. In case that the second transistor M2 is turned on, the j-th data line DLj and the second node N2 may be electrically connected to each other.

In case that the second scan signal GR is supplied to the second scan line SL2*i*, the third transistor M3 may be turned on. In case that the third transistor M3 is turned on, the second node N2 and the third node N3 may be electrically connected to each other.

In case that the third scan signal GC is supplied to the third scan line SL3*i*, the fourth transistor M4 may be turned on. In case that the fourth transistor M4 is turned on, the first node N1 and the fourth node N4 may be electrically connected to each other.

During the first period T1, the reference power voltage Vref may be supplied to the j-th data line DLj. The reference power voltage Vref supplied to the j-th data line DLj may be supplied to the second node N2, the third node N3, the fourth node N4, and the first node N1. For example, during the first period T1, the first to fourth nodes N1 to N4 may be initialized by the reference power voltage Vref.

Since the reference power voltage Vref is supplied to the first node N1 during the first period T1, the first capacitor C1 may be initialized by the reference power voltage Vref regardless of a voltage supplied in a previous period (or a previous frame period). Since the reference power voltage Vref is supplied to the first node N1 and the second node N2 during the first period T1, the second capacitor C2 may be initialized by the reference power voltage Vref regardless of the voltage supplied in the previous frame period.

In case that the reference power voltage Vref is supplied to the third node N3 during the first period T1, the first electrode of the light emitting element LD may be initialized by the reference power voltage Vref. For example, the reference power voltage Vref may be set so that the light emitting element LD may be turned off, and thus the light emitting element LD may be set to a turn-off state during the first period T1.

Referring to FIG. 14B, during the second period T2, the first emission control signal EM1 may be supplied to the first emission control line EL1*k*. In case that the first emission control signal EM1 is supplied to the first emission control line EL1*k*, the fifth transistor M5 may be turned off. In case that the fifth transistor M5 is turned off, electrical connection between the third node N3 and the fourth node N4 may be cut off.

During the second period T2, the first scan signal GW may be supplied to the first scan line SL1*i*, the second scan signal GR may be supplied to the second scan line SL2*i*, and the third scan signal GC may be supplied to the third scan line SL3*i*. For example, the second emission control signal EM2 may be supplied to the second emission control line EL2*k*.

In case that the first scan signal GW is supplied, the second transistor M2 may maintain a turn-on state, and in case that the second scan signal GR is supplied, the third transistor M3 may maintain a turn-on state. Then, the reference power voltage Vref from the j-th data line DLj may be supplied to the second node N2 and the third node N3. At this time, the light emitting element LD may maintain a turn-off state.

In case that the second emission control signal EM2 is supplied to the second emission control line EL2*k*, the sixth transistor M6 may maintain a turn-off state. In case that the third scan signal GC is supplied, the fourth transistor M4 may maintain a turn-on state. In case that the fourth transistor M4 is turned on, the first transistor M1 may be connected in the diode form.

For example, a voltage of the first electrode of the first transistor M1 may be set to a voltage of the first driving power voltage VDD by a parasitic capacitor or the like. Therefore, in case that the first transistor M1 is connected in the diode form, the voltage of the first node N1 may be set to a voltage obtained by subtracting an absolute value threshold voltage of the first transistor M1 from the first driving power voltage VDD. For example, the voltage of the first node N1 may be increased from the reference power voltage Vref to the voltage obtained by subtracting the absolute value threshold voltage of the first transistor M1 from the first driving power voltage VDD.

In case that the voltage of the first node N1 is set to the voltage obtained by subtracting the absolute value threshold voltage of the first transistor M1 from the first driving power voltage VDD, a voltage corresponding to the threshold voltage of the first transistor M may be stored in the first capacitor C1. For example, during the second period T2, the voltage corresponding to the threshold voltage of the first transistor M1 may be stored in the first capacitor C1.

Thereafter, an operation process of the third to fourth periods T3 to T4 may be the same as that described with reference to FIG. 4, and thus a detailed description thereof is omitted for descriptive convenience.

In concluding the detailed description, those skilled in the art will appreciate that many variations and modifications may be made to the embodiments without substantially departing from the principles and spirit and scope of the disclosure. Therefore, the disclosed embodiments are used in a generic and descriptive sense only and not for purposes of limitation.

What is claimed is:

1. A pixel comprising:
- a first transistor including:
  - a first electrode electrically connected to a first power line,
  - a second electrode, and
  - a gate electrode connected to a first node;
- a light emitting element including:
  - a first electrode, and
  - a second electrode electrically connected to a second power line;
- a second transistor connected between a data line and a second node, and including a gate electrode electrically connected to a first scan line;
- a third transistor connected between the second node and the first electrode of the light emitting element, and including a gate electrode electrically connected to a second scan line;
- a first capacitor connected between the first power line and the first node; and
- a second capacitor connected between the first node and the second node, wherein
- both the first transistor and the third transistor are in a turn-on state during at least a portion of a period.

2. The pixel of claim 1, further comprising:
- a fourth transistor connected between the first node and the second electrode of the first transistor, and including a gate electrode electrically connected to a third scan line; and
- a fifth transistor connected between the second electrode of the first transistor and the first electrode of the light emitting element, and including a gate electrode electrically connected to a first emission control line.

3. The pixel of claim 2, wherein the second transistor, the third transistor, the fourth transistor, and the fifth transistor are turned on during an initialization period.

4. The pixel of claim 3, wherein the second transistor, the third transistor, and the fourth transistor maintain a turn-on state and the fifth transistor is turned off during a compensation period after the initialization period.

5. The pixel of claim 4, wherein during a data writing period after the compensation period, a data signal is supplied to the data line, the second transistor maintains a turn-on state, and the third and fourth transistors are turned off.

6. The pixel of claim 4, wherein a reference power voltage is supplied to the data line during the initialization period and the compensation period, and the reference power voltage is set to a voltage that turns off the light emitting element.

7. The pixel of claim 4, wherein during the initialization period and the compensation period, a reference power voltage is supplied to the data line, and the reference power voltage is set to a voltage between a first driving power voltage supplied to the first power line and a second driving power voltage supplied to the second power line.

8. The pixel of claim 2, wherein the second scan line and the third scan line are formed as a same scan line.

9. The pixel of claim 3, further comprising:
- a sixth transistor connected between the first power line and the first electrode of the first transistor, and including a gate electrode electrically connected to a second emission control line.

10. The pixel of claim 9, wherein the sixth transistor is set to a turn-off state during a horizontal period in which a data signal is supplied.

11. A display device comprising:
- pixels connected to first scan lines, second scan lines, third scan lines, data lines, and first emission control lines, wherein
- a pixel positioned in an i-th pixel row and a j-th pixel column, where i and j are integers greater than or equal to 1, the pixel comprises:
  - a first transistor including:
  - a first electrode electrically connected to a first power line,
  - a second electrode, and
  - a gate electrode connected to a first node;
- a light emitting element including:
  - a first electrode, and
  - a second electrode connected to a second power line;
- a second transistor connected between a j-th data line and a second node, the second transistor that is turned on in case that a first scan signal is supplied to an i-th first scan line;

a third transistor connected between the second node and the first electrode of the light emitting element, the third transistor that is turned on in case that a second scan signal is supplied to an i-th second scan line;

a first capacitor connected between the first power line and the first node; and a second capacitor connected between the first node and the second node, wherein both the first transistor and the third transistor are in a turn-on state during at least a portion of a period.

12. The display device of claim 11, wherein the pixel positioned in the i-th pixel row and the j-th pixel column further comprises:

a fourth transistor connected between the first node and the second electrode of the first transistor, the fourth transistor that is turned on in case that a third scan signal is supplied to an i-th third scan line; and a fifth transistor connected between the second electrode of the first transistor and the first electrode of the light emitting element, the fifth transistor that is turned off in case that a first emission control signal is supplied to a k-th emission control line, where k is an integer greater than or equal to 1.

13. The display device of claim 12, further comprising:

a data driver that supplies a data signal to the data lines;

a scan driver that supplies the first scan signal to the first scan lines, the second scan signal to the second scan lines, and the third scan signal to the third scan lines; and a first emission driver that supplies the first emission control signal to the first emission control lines.

14. The display device of claim 13, wherein a horizontal period includes an initialization period, a compensation period, and a data writing period, and the scan driver supplies the first scan signal to the i-th first scan line during the initialization period, the compensation period, and the data writing period, and supplies the second scan signal to the i-th second scan line and the third scan signal to the i-th third scan line during the initialization period and the compensation period.

15. The display device of claim 14, wherein the second scan line and the third scan line are formed as a same scan line, and the third scan signal and the second scan signal are a same signal.

16. The display device of claim 15, wherein the scan driver comprises:

a first scan driver that supplies the first scan signal; and a second scan driver that supplies the second scan signal.

17. The display device of claim 14, wherein the scan driver comprises:

a first scan driver that supplies the first scan signal;

a second scan driver that supplies the second scan signal; and a third scan driver that supplies the third scan signal.

18. The display device of claim 14, wherein the data driver supplies a reference power voltage to the j-th data line during the initialization period and the compensation period, and supplies the data signal during the data writing period.

19. The display device of claim 18, wherein the reference power voltage is set so that the light emitting element is turned off.

20. The display device of claim 18, wherein the reference power voltage is set to a voltage between a first driving power voltage supplied to the first power line and a second driving power voltage supplied to the second power line.

21. The display device of claim 14, wherein the pixels are further connected to second emission control lines, and the pixel positioned in the i-th pixel row and the j-th pixel column further comprises a sixth transistor connected between the first power line and the first electrode of the first transistor, the sixth transistor that is turned off in case that a second emission control signal is supplied to a k-th second emission control line.

22. The display device of claim 21, further comprising:

a second emission driver that supplies a second emission control signal to the second emission control lines, wherein the second emission driver supplies the second emission control signal to the k-th second emission control line during the initialization period, the compensation period, and the data writing period.

* * * * *